(12) United States Patent
 Isshiki et al.

(10) Patent No.: US 12,079,867 B2
(45) Date of Patent: Sep. 3, 2024

(54) ELECTRONIC TRANSACTION SYSTEM, TRANSACTION SERVER, VERIFICATION SERVER, METHOD OF TRANSACTION, AND PROGRAM

(71) Applicant: NEC Corporation, Tokyo (JP)

(72) Inventors: Toshiyuki Isshiki, Tokyo (JP); Kazue Sako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1016 days.

(21) Appl. No.: 16/975,555

(22) PCT Filed: Mar. 29, 2018

(86) PCT No.: PCT/JP2018/013481
§ 371 (c)(1),
(2) Date: Aug. 25, 2020

(87) PCT Pub. No.: WO2019/186978
PCT Pub. Date: Oct. 3, 2019

(65) Prior Publication Data
US 2020/0402171 A1    Dec. 24, 2020

(51) Int. Cl.
*G06Q 40/04*        (2012.01)
*G06F 16/23*        (2019.01)
(Continued)

(52) U.S. Cl.
CPC ......... *G06Q 40/04* (2013.01); *G06F 16/2379* (2019.01); *G06F 21/602* (2013.01);
(Continued)

(58) Field of Classification Search
CPC ........ G06Q 40/04; G06Q 10/10; G06Q 20/02; G06Q 20/38215; G06Q 20/401;
(Continued)

(56) References Cited

U.S. PATENT DOCUMENTS 8,843,997 B1 * 9/2014 Hare ................... H04L 63/0815
709/200
10,853,808 B1 * 12/2020 Lawrence ........ G06Q 20/40145
(Continued)

FOREIGN PATENT DOCUMENTS

JP    2001-217824 A    8/2001
JP    2001-357252 A    12/2001
(Continued)

OTHER PUBLICATIONS

Andreas M. Antonopoulos, Mastering Bitcoin, Dec. 2014, O'Reilly Media, Inc. (Year: 2014).*
(Continued)

*Primary Examiner* — Nilesh B Khatri

(57) ABSTRACT

An electronic transaction system includes a plurality of administration servers, a terminal, a transaction server. The plurality of administration servers provides an electronic bulletin board. The terminal writes bid data including an encrypted price to the electronic bulletin board. The transaction server gets the written bid data, decrypts the encrypted price, executes transaction using the decrypted price by Zaraba scheme.

19 Claims, 21 Drawing Sheets

(51) Int. Cl.

| | |
|---|---|
| *G06F 21/60* | (2013.01) |
| *G06F 40/289* | (2020.01) |
| *G06Q 10/10* | (2023.01) |
| *G06Q 20/02* | (2012.01) |
| *G06Q 20/38* | (2012.01) |
| *G06Q 20/40* | (2012.01) |
| *G06Q 30/08* | (2012.01) |
| *G06Q 50/06* | (2012.01) |
| *H04L 9/32* | (2006.01) |
| *H04L 51/046* | (2022.01) |

(52) U.S. Cl.
CPC .......... *G06F 40/289* (2020.01); *G06Q 10/10* (2013.01); *G06Q 20/02* (2013.01); *G06Q 20/38215* (2013.01); *G06Q 20/401* (2013.01); *G06Q 30/08* (2013.01); *G06Q 50/06* (2013.01); *H04L 9/3221* (2013.01); *H04L 51/046* (2013.01); *G06Q 2220/00* (2013.01)

(58) Field of Classification Search
CPC .... G06Q 30/08; G06Q 50/06; G06Q 2220/00; G06F 16/2379; G06F 40/289; G06F 21/602; H04L 9/3221; H04L 51/046
See application file for complete search history.

(56) References Cited

U.S. PATENT DOCUMENTS

| | | | | |
|---|---|---|---|---|
| 11,170,363 | B1* | 11/2021 | Maeng | G06Q 20/3823 |
| 2003/0074330 | A1* | 4/2003 | Asokan | H04L 9/3218 |
| | | | | 705/80 |
| 2005/0234798 | A1* | 10/2005 | Du Preez | G06Q 40/00 |
| | | | | 705/37 |
| 2009/0083190 | A1 | 3/2009 | Isshiki et al. | |
| 2009/0182667 | A1* | 7/2009 | Parkes | H04L 9/14 |
| | | | | 705/50 |
| 2011/0071947 | A1* | 3/2011 | Muthukrishnan | G06Q 30/018 |
| | | | | 705/14.71 |
| 2012/0078815 | A1* | 3/2012 | Rossi | G06Q 40/06 |
| | | | | 705/36 R |
| 2016/0253749 | A1* | 9/2016 | Gray | G06Q 30/0641 |
| | | | | 705/26.3 |
| 2017/0041132 | A1* | 2/2017 | Nicholls | H04L 9/0825 |
| 2018/0300741 | A1* | 10/2018 | Leonard | G06Q 30/08 |
| 2019/0193587 | A1 | 6/2019 | Haneda | |
| 2020/0177603 | A1* | 6/2020 | Wang | G06Q 20/3825 |

FOREIGN PATENT DOCUMENTS

| | | |
|---|---|---|
| JP | 2002-215935 A | 8/2002 |
| JP | 2006-196028 A | 7/2006 |
| JP | 2008-020871 A | 1/2008 |
| JP | 2017-059872 A | 3/2017 |
| JP | 6177410 B1 | 8/2017 |
| JP | 2017-195627 A | 10/2017 |
| JP | 6234540 B1 | 11/2017 |
| WO | 2007/063876 A1 | 6/2007 |

OTHER PUBLICATIONS

Jan Camenisch, et al., Efficient Protocols for Set Membership and Range Proofs, 2008, Proceedings of the 14th International Conference on the Theory and Application of Cryptology and Information Security, 234-252 (Year: 2008).*

Zhili Chen, et al., On Privacy-Preserving Cloud Auction, Dec. 22, 2016, IEEE, pp. 279-288 (Year: 2016).*

International Search Report for PCT Application No. PCT/JP2018/013481, mailed on Jun. 26, 2018.

Kenji Tanaka, etc., "A proposal on a power transfer trading platform using blockchain" Abstracts of 2018 Symposium on Cryptography and Information Security, SCIS2018, Jan. 23, 2018, Japan.

Jan Camenisch, etc., "Efficient Protocols for Set Membership and Range Proofs", 2008, Proceedings of the 14th International Conference on the Theory and Application of Cryptology and Information Security, 234-252, USA.

Oded Goldreich, etc., "Proofs that Yield Nothing But Their Validity or All Languages in NP Have Zero-Knowledge Proof Systems", Jul. 1991, Journal of the ACM (JACM) vol. 38, USA.

* cited by examiner

FIG. 4A

SELL BID DATA

| SELL | PARTICIPANTS ID | QUANTITY | SELL PRICE |
|---|---|---|---|

FIG. 4B

BUY BID DATA

| BUY | PARTICIPANTS ID | QUANTITY | BUY PRICE |
|---|---|---|---|

FIG. 5

CONTRACTED DATA

| TXID OF SELL BID DATA | TXID OF BUY BID DATA |

FIG. 6

| ⋮ | ⋮ | ⋮ | ⋮ | ⋮ |
|---|---|---|---|---|
| TXID=01 | SELL | PID=01 | 20 | 19 |
| TXID=02 | SELL | PID=02 | 30 | 24 |
| TXID=03 | BUY | PID=03 | 20 | 19 |
| TXID=04 | SELL BID TXID=01 | | BUY BID TXID=03 | |
| ⋮ | ⋮ | ⋮ | ⋮ | ⋮ |

FIG. 9

BID ADMINISTRATION TABLE

| QUANTITY OF SELL | PRICE | QUANTITY OF BUY |
|---|---|---|
| 20 | Over | |
| 30 | 24 | |
| 10 | 23 | |
| 20 | 22 | |
| 10 | 21 | |
| 10 | 20 | |
| | 19 | 40 |
| | 18 | 20 |
| | 17 | 30 |
| | 16 | 20 |
| | 15 | 10 |
| | Under | 20 |

| PARTICIPA-NTS ID | QUANTITY | BID TIME |
|---|---|---|
| PID1 | 10 | 12:01 |
| PID2 | 20 | 12:10 |
| PID3 | 10 | 12:15 |

FIG. 17A

| QUANTITY OF SELL | PRICE | QUANTITY OF BUY |
|---|---|---|
| 20 (TXID=11) | 22 | |
| 10 (TXID=12) | 21 | |
| 10 (TXID=13) | 20 | |
| | 19 | 40 (TXID=21) |
| | 18 | 20 (TXID=22) |
| | 17 | 30 (TXID=23) |

FIG. 17B

| TXID | SELL PRICE | QUANTITY OF SELL |
|---|---|---|
| 30 | 20 | 30 |

ELECTRONIC TRANSACTION SYSTEM, TRANSACTION SERVER, VERIFICATION SERVER, METHOD OF TRANSACTION, AND PROGRAM

TECHNICAL FIELD

Reference to Related Application

This application is a National Stage Entry of PCT/JP2018/013481 filed on Mar. 29, 2018, the contents of all of which are incorporated herein by reference, in their entirety.

The present invention relates to an electronic transaction system, a transaction server, a verification server, method of transaction, and program.

BACKGROUND

In recent years, with development of electric communication technology and information processing technology, various services have been provided to users via networks. For example, PTL (Patent Literature) 1 discloses an electronic transaction system using network. Also, PTL 2, PTL 3 and NPL (Non-Patent Literature) 1 discloses a system adopted to buy and sell the electricity on the network.

When we make a deal on network, it is important to avoid leaking information and frauding. In this regard, PTL 4 mentions to provide a method and an apparatus that can efficiently prove and verify that an output from each of servers is an outcome of changing orders of a result of a proper processing of an input with less calculation amount and less communication traffic.

NPL 2 and NPL 3 disclose a method of proving that a plaintext decrypted from certain encrypted text falls within a predetermined range without revealing the plaintext.

JP Patent Kokai Publication No. JP2002-215935A
JP Patent Publication No. 6177410
JP Patent Publication No. 6234540
JP Patent Kokai Publication No. JP2001-217824A Kenji Tanaka, etc., "A proposal on an electricity trading platform using blockchain" Abstracts of 2018 Symposium on Cryptography and Information Security, SCIS2018, Jan. 23, 2018

Jan Camenisch, etc., "Efficient Protocols for Set Membership and Range Proofs", 2008, Proceedings of the 14th International Conference on the Theory and Application of Cryptology and Information Security, 234-252

ODED GOLDREICH, etc., "Proofs that Yield Nothing But Their Validity or All Languages in NP Have Zero-Knowledge Proof Systems", July 1991, Journal of the ACM (JACM) Volume 38

SUMMARY

Each disclosure of the above literatures is incorporated herein by reference thereto. The following analysis has been made by the present inventors.

As mentioned above, various services are provided on networks. Especially on NPL 1, an art of utilizing blockchain for the electricity trading is disclosed. According to the art, based on their own electricity consumption and electric power generation, individual users estimate deficiency and excess of the electric power, and perform the electric power trading on the blockchain whereby electric power transfer can be realized.

However, according to NPL 1, individual ordering information (bid data) is registered in plaintext, at least a participant of electricity trading system can grasp an order status of other participants. If so, it offers possibility of spoiling legitimacy of transaction. For example, it can permit the fraud that even though a participant has no intent to sell and buy, the participant pretends as if there is a large demand for electric power by making a large quantity of buying bids, to realize selling the power at a favorable price.

It is a main object of the present invention to provide an electronic transaction system, a transaction server, a verification server, method of transaction, and program that contribute to provide legitimate transaction.

According to a first aspect of the present invention, there is provided an electronic transaction system, including: a plurality of administration server that provides an electronic bulletin board; a terminal that writes bid data including an encrypted price to the electronic bulletin board; a transaction server that gets the written bid data, decrypts the encrypted price, and executes a transaction using the decrypted price by Zaraba scheme.

According to a second aspect of the present invention, there is provided a transaction server configured to get bid data, including an encrypted price, written by a terminal to an electronic bulletin board provided by a plurality of administration servers, decrypt the encrypted price, and execute a transaction using the decrypted price by Zaraba scheme.

According to a third aspect of the present invention, there is provided a verification server, configured to get bid data, including an encrypted price, written by a terminal to electronic bulletin boards provided by a plurality of administration servers, decrypt the encrypted price, execute a transaction using the decrypted price by Zaraba scheme, and generate verification data including a verification character string that verifies legitimacy of the transaction executed by a transaction server using the encrypted price of the bid data that is a target of verification of the legitimacy of the transaction executed by the transaction server and the encrypted price of uncontracted bid data.

According to a fourth aspect of the present invention, there is provided an electronic transaction method, performed by a transaction server, including: receiving a bid data including an encrypted price written by a terminal to an electronic bulletin board provided by a plurality of administration servers; decrypting the encrypted price; and executing a transaction using the decrypted price by Zaraba scheme.

According to a fifth aspect of the present invention, there is provided a program, causing a computer loaded on a transaction server to perform processings of: receiving bid data including an encrypted price written by a terminal to an electronic bulletin board provided by a plurality of administration servers; decrypting the encrypted price; executing a transaction using the decrypted price by Zaraba scheme. This program can be stored in a computer-readable storage medium. The storage medium may be a non-transient storage medium such as a semiconductor memory, a hard disk, a magnetic storage medium, or an optical storage medium. The present invention can be embodied as a computer program product.

According to respective aspects of the present invention and disclosure, there are provided an electronic transaction system, a transaction server, a verification server, method of transaction, and program that contribute to provide a legitimate transaction.

BRIEF DESCRIPTION OF THE DRAWINGS

FIG. 4 is a schematic diagram illustrating bid data.

FIG. 5 illustrates an example of contracted data.

FIG. 6 illustrates an example of data that is written to an electronic bulletin board provided by a data administration system.

FIG. 9 illustrates an example of an administration table of bid.

FIG. 17 is a schematic diagram illustrating an operation in a verification server according to the second exemplary configuration.

PREFERRED MODES

Figure 1:
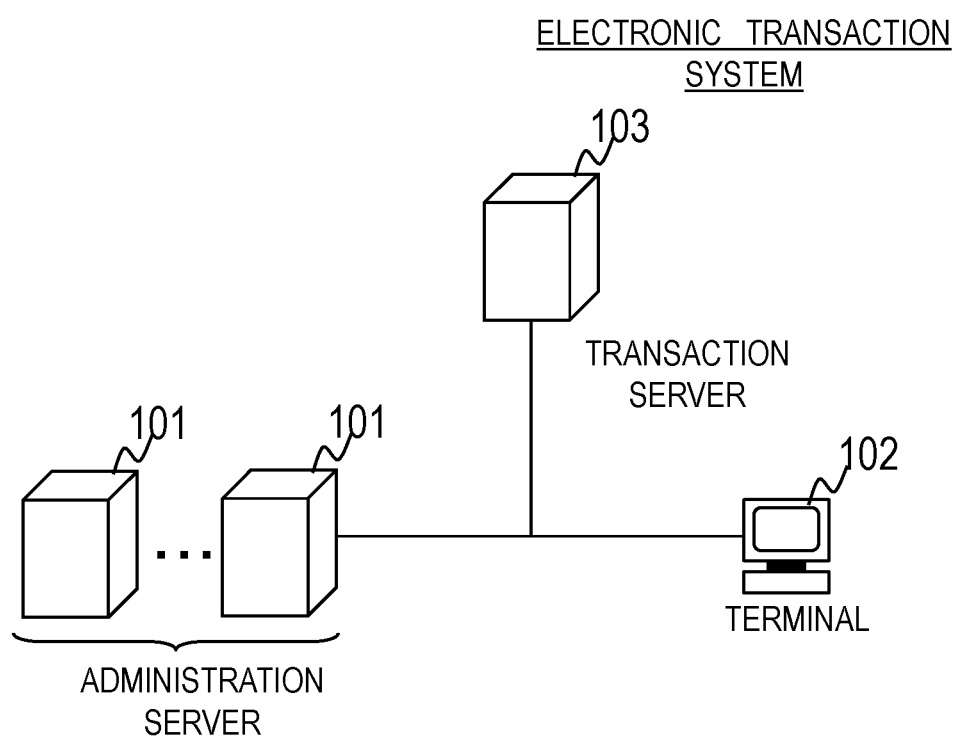
FIG. 1 illustrates an outline of an exemplary embodiment.

First, an outline of an exemplary embodiment will be described. In the following outline, various components are attached with reference characters for the sake of convenience. Namely, the following reference characters are merely used as examples to facilitate understanding of the outline. Thus, the disclosure is not limited to the description of the following outline. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

A data extraction system according to an exemplary embodiment includes a plurality of administration server 101, a terminal 102, a transaction server 103 (see FIG. 1). A plurality of administration server 101 provides an electronic bulletin board. The terminal 102 writes bid data including encrypted price to the electronic bulletin board. The transaction server 103 gets the written bid data, decrypts the encrypted price, and executes a transaction using the decrypted price by Zaraba scheme (with price priority, with time priority).

In the electronic transaction system according to the above exemplary embodiment, the terminal 102, for example, encrypts bid data using a public key, registers the bid data with the electronic bulletin board. It is the transaction server 103 that can decrypt the encrypted bid data with a private key. Other participants cannot know contents of the bid data. As a result, the secrecy of bid information is kept. The above electronic transaction system can provide a fair and legitimate transaction.

Hereinafter, concrete exemplary embodiments will be described in more detail with reference to the drawings. In the exemplary embodiments, like reference characters refer to like components, and description thereof will be omitted.

First Exemplary Embodiment

A first exemplary embodiment will be described in more detail with reference to the drawings.

[Outline of System Configuration]

Figure 2:
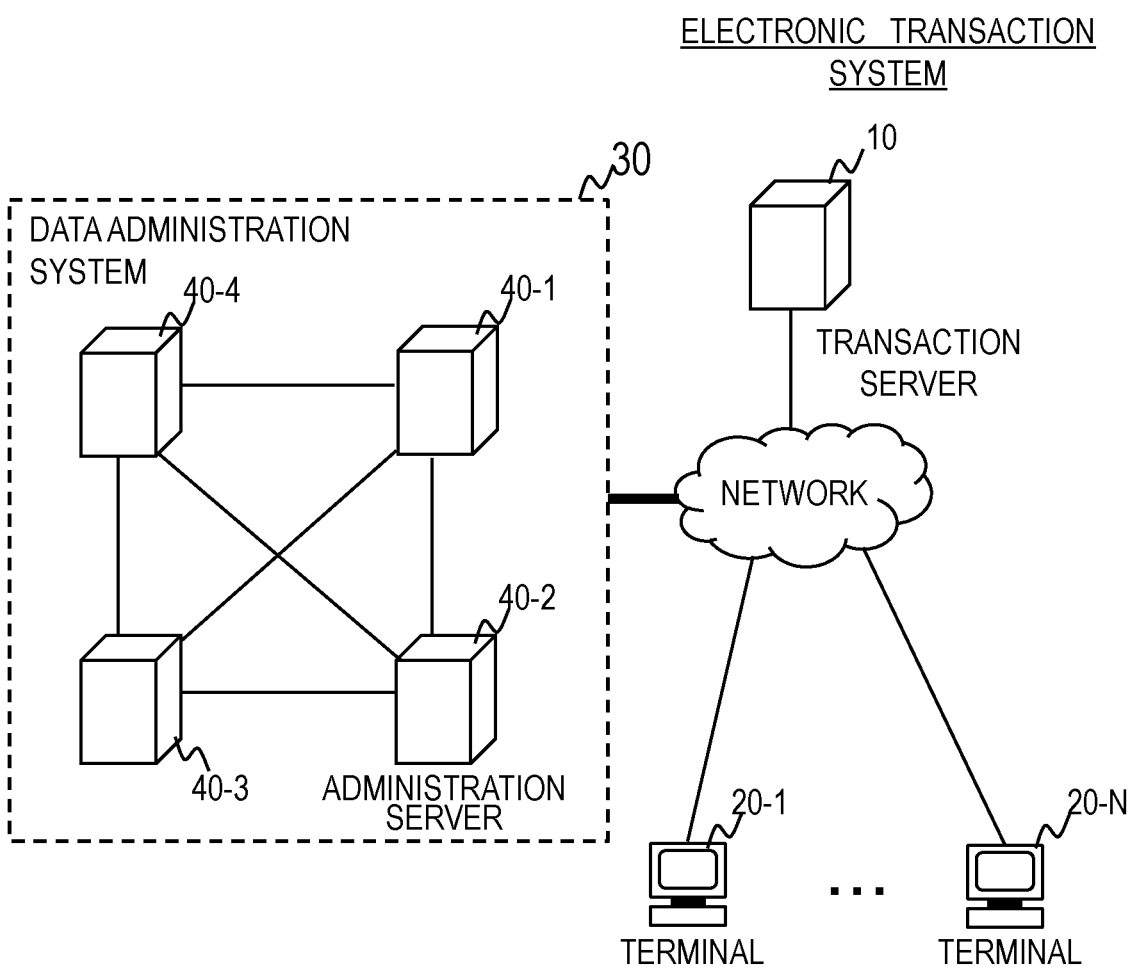
FIG. 2 illustrates an example of a schematic configuration of an electronic transaction system according to a first exemplary embodiment.

FIG. 2 illustrates an example of a schematic configuration of an electronic transaction system according to the first exemplary embodiment. Referring to FIG. 2, the electronic transaction system is configured including a transaction server 10, a plurality of terminals 20-1 to 20-N (N is positive integer, same applies below), a data administration system 30.

The transaction server 10, the terminals 20-1 to 20-N, and the data administration system 30 are connected with each other via network as Internet etc.

Though the target of the electronic transaction system is not especially limited, the present disclosure describes the electric power (may be termed as 'electricity', too) as the target of transaction. But the electronic transaction system in the present disclosure is applicable to financial products, etc., such as stocks, etc.

The transaction server 10 is an apparatus that mediates orders of seller and buyer.

The terminals 20-1 to 20-N are used by participants of electric power transaction. For example, these correspond to information terminal such as personal computer or smart phone, etc. Note that, if there is no particular reason to distinguish the terminals 20-1 to 20-N, hereinafter simply they are denoted as 'terminal 20'.

Also, when a user of the terminal 20 desires to buy electricity, the terminal used by the user is denoted as 'buyer terminal'. Similarly, when a user of the terminal 20 desires to sell electricity, the terminal used by the user is denoted as 'seller terminal'.

The data administration system 30 is operated by an independent organization, etc., that is independent of operator of the transaction server 10 and participants of the electric power transaction (bidder; seller, buyer). The data administration system 30 provides an electronic bulletin board that can be added and read by the external (third party). More concretely, the data administration system 30 provides the electronic bulletin board, to that anybody can add information, from that anybody can read written information, and, once written, that information cannot be erased and tampered. The data administration system 30 provides the electronic bulletin board that has above-mentioned feature realized by so called blockchain technology.

The electronic transaction system illustrated in FIG. 2 transfers and receives necessary information for electric power transaction (Hereinafter, it is described as electric power transaction data) via an electronic bulletin board realized by blockchain. Note that, as above described, because the data administration system 30 provides anybody with the electronic bulletin board, there are mixed data irrelevant to the above-mentioned electric power transaction data.

The data administration system 30 is configured with a plurality of administration servers 40-1 to 40-4. Note that an example illustrated FIG. 2 does not mean that the number of the data administration system is limited to four. The data administration system 30 requires more than or equal to two administration servers. Also, same as the terminal 20, when there is no particular reason for distinguishing the administration servers 40-1 to 40-4, the servers are simply described as 'the administration server 40'.

A plurality of the administration servers 40 that configure the data administration system 30, as illustrated in FIG. 2, are directly connected each other. Namely, the data administration system 30 is configured by including the administration servers 40 that are interconnected by P2P (Peer to Peer) connection.

In the data administration system 30, each of the administration servers 40 interconnected by P2P connections includes an administration ledger for managing received data from the external (for example, the electric power transaction data). The data administration system 30 administrates the administration ledger that is distributedly shared by the plurality of the administration servers 40.

Every time upon receiving a request for writing electric power transaction to the electronic bulletin board of the transaction server, the administration servers 40 that configure the data administration system 30 add the electric power transaction data to the data administration ledger. Also, each of the administration servers 40 generates data that proves legitimacy or fairness of data that is added to the data administration ledger. More concretely, the administration server 40 uses an electronic signature (digital signature) that proves legitimacy of the above added data.

When they finish generating the electronic signature, the administration server 40 adds the electronic signature to added data to the data administration ledger, distribute to other administration servers 40. When the other administration servers 40 receive the additional data, they update their own data administration ledger after proving the legitimacy of the data.

[Schematic Operation of System]

Next, description of schematic operation of the electronic transaction system in the first exemplary embodiment is illustrated by referring to drawings.

Figure 3:
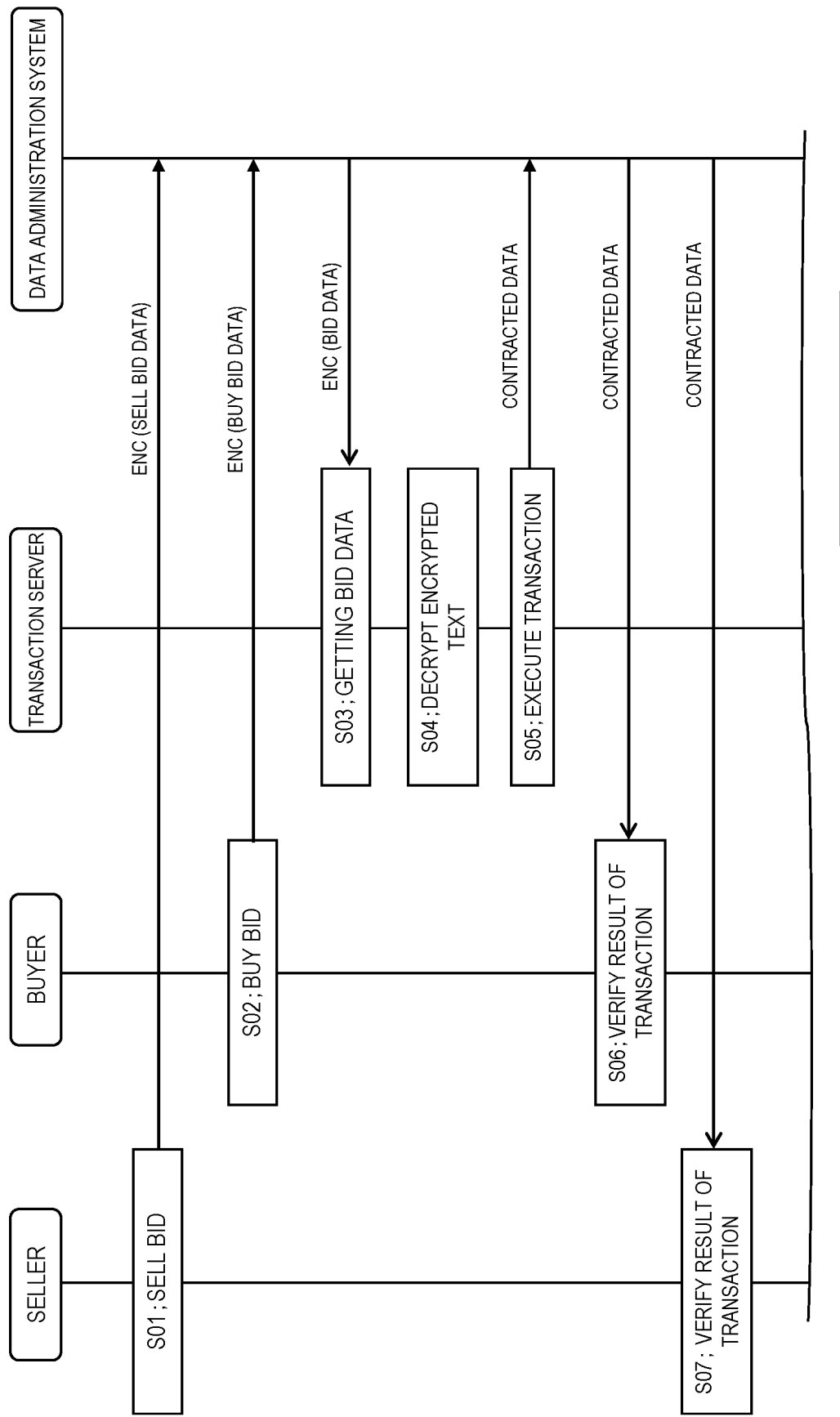
FIG. 3 is a sequence diagram illustrating an example of an operation in the electronic transaction system according to a first exemplary embodiment.

FIG. 3 illustrates a sequence diagram of an example of a schematic operation of the electronic transaction system in the first exemplary embodiment.

A participant who desires to sell electricity writes 'sell bid data' including type of selling or buying (order of selling), identifier specifying himself (Participant's ID; Identifier), quantity of electric power desired to sell (quantity), desired price to sell (price) to the electronic bulletin board (sell bid; step S01).

At that time, a terminal of seller encrypts sell bid data with public key of the transaction server 10, and transmits the data to the data administration system 30. For example, the data illustrated in FIG. 4A is encrypted, and written to the electronic bulletin board.

Similarly, a participant who desires to sell the electricity writes 'buy bid data' including type of selling or buying (order of buying), identifier specifying himself, quantity of electric power desired to sell, desired price to sell to the electronic bulletin board (buy bid; step S02).

The terminal of seller encrypts buy bid data with public key of the transaction server 10, and transmits the data to the data administration system 30. For example, the data illustrated in FIG. 4B is encrypted, and written to the electronic bulletin board.

The terminal 20 may encrypt only the quantity [sic. price] of electric power desired to sell, not necessarily encrypt all the four items (type of selling or buying, participant's ID, quantity of electric power desired to sell, price to sell) illustrated in FIG. 4, because it can be ensured safety of transaction that at least the quantity [sic. price] of electric power expecting to sell is encrypted. In this way, the terminal according to the first exemplary embodiment writes bid data including the encrypted price to the electronic bulletin board.

Note that in the description hereinafter if there is no necessity of distinguishing sell bid data from buy bid data, it is written simply as 'bid data'.

The transaction server 10 periodically accesses the electronic bulletin board, and gets bid data (step S03).

Because the got bid data is encrypted, the transaction server 10 decrypts the encrypted text of bid data that is got, using private key of its own (step S04).

The transaction server 10 executes transaction on predetermined timing etc. (step S05). Detail of transaction by the transaction server 10 is described below.

The transaction server 10 writes result of transaction to the electronic bulletin board.

Note that when bid data is written to the electronic bulletin board, transaction ID (hereinafter it is termed as TXID) is given. The transaction server 10 writes result of transaction using the TXID. More concretely, the transaction server 10, when sell bid and buy bid are established (contracted), the data including the TXID of the contracted bid data is written to the electronic bulletin board (see FIG. 5).

Also, the transaction server 10 identifies the contracted TXID, and writes an erase data representing the fact that the TXID concerned has already been erased to the electronic bulletin board. Based on the erase data, the terminal 20 can grasp bid data remaining in the marketplace of transaction (uncontracted bid data).

The seller and the buyer access the electronic bulletin board, get the contracted data, and verify result of the transaction (step S06, step S07). Namely, the terminals 20 (the terminal of the seller, the terminal of the buyer) get the contracted data written to the electronic bulletin board, and verify whether its own bid is contracted or not.

The terminal 20, by referring to contracted data, can grasp status (contracted, uncontracted) of its own bid data. Or by confirming the erase data, the terminal 20 (the terminal of the seller, the terminal of the buyer) can confirm whether its own bid is contracted or not.

The terminal 20, if the TXID written on the contracted data corresponds to its own bid, can grasp that its own bid is contracted. On the other hand, the terminal 20, if the TXID written on the contracted data does not correspond to its own bid, can grasp that its own bid is not contracted and it remains in the electronic bulletin board (marketplace of transaction) as uncontracted bid.

For example, it is assumed that electric power transaction data (bid data, contracted data) illustrated in FIG. 6 are written to the electronic bulletin board. FIG. 6 illustrates that sell bid of TXID '01', '02' were executed before buy bid of TXID '03' was executed. After that, sell bid of TXID '01' and buy bid of TXID '03' were contracted, the contracted data named TXID '04' was written to the electronic bulletin board. Note that 'PID' illustrated in FIG. 6 indicates participant's ID.

By verifying electric power transaction data (bid data, contracted data) as shown in FIG. 6, the transaction server 10, and the terminal 20 can confirm that sell bid of TXID '02' remains in the electronic bulletin board as uncontracted bid data.

Namely, the transaction server 10 can grasp latest bid status (bid data remaining in the electronic bulletin board as uncontracted data). Similarly, by tracing electric power transaction data written to the electronic bulletin board, the terminal 20 can grasp latest bid status.

Note, the terminal 20 can grasp the bid status (contracted, uncontracted) related to itself, however, detail (at least detail of price) of bid data remaining on the electronic bulletin board cannot be grasped because bid data is encrypted.

[Hardware Configuration]

Next, a hardware configuration of various kinds of apparatuses included in the electronic transaction system according to the first exemplary embodiment will be described.

Figure 7:
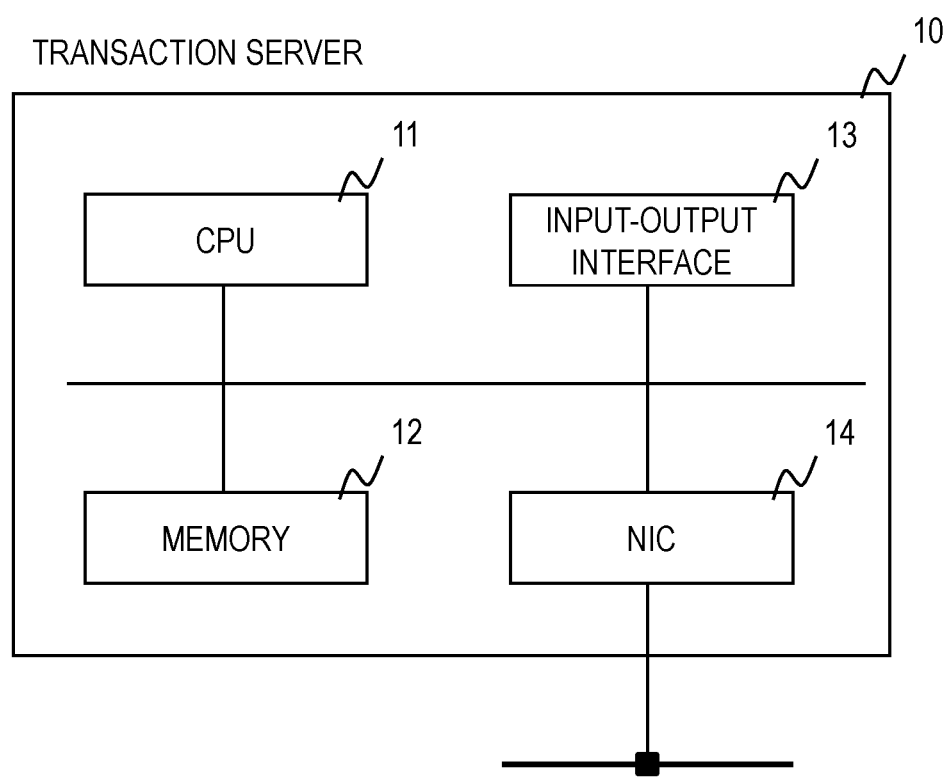
FIG. 7 is a block diagram illustrating an example of a hardware configuration of the transaction server according to the first exemplary embodiment.

FIG. 7 is a block diagram illustrating an example of a hardware configuration of the transaction server 10 according to the first exemplary embodiment.

The transaction server 10 can be configured by an information processing apparatus (computer) and has a configuration illustrated in FIG. 7. For example, the transaction server 10 includes a CPU (Central Processing Unit) 11, a memory 12, an input-output interface 13, and a NIC (Network Interface Card) 14 as communication means, etc.

The hardware configuration of the transaction server 10 is not limited to the configuration illustrated in FIG. 7. The transaction server 10 may include hardware not illustrated in FIG. 7 or may be configured without input-output interface 13 according to needs. In addition, the number of CPUs or the like included in the transaction server 10 is not limited to the example illustrated in FIG. 8. For example, a plurality of CPUs may be included in the transaction server 10.

The memory 12 is a RAM (Random Access Memory), a ROM (Read Only Memory), or an auxiliary storage device (a hard disk or the like).

The input-output interface 13 is means serving as an interface for a display apparatus or an input apparatus not illustrated. The display apparatus is, for example, a liquid crystal display. The input apparatus is, for example, an apparatus that receives user operations such as a keyboard or a mouse or the like.

Functions of the transaction server 10 are realized by processing modules as described below. For example, an individual one of the processing modules is realized by causing the CPU 11 to execute a program stored in the memory 12. In addition, the program can be updated by downloading an updated program via a network or by using a storage medium in that an updated program is stored. Further, an individual one of the above processing modules may be realized by a semiconductor chip. Namely, it is only necessary to have means for executing the functions of the above processing modules by using any hardware and/or software.

Note that the administration server 40 as well as the terminal 20 can be configured by an information processing apparatus in the same way as the transaction server 10. Since the basic configurations of these hardware has no difference from the transaction server 10, the descriptions are omitted.

[Operational Configuration of Transaction Server]

Next, detail of the transaction server 10 is described. The transaction server 10 gets bid data written to the electronic bulletin board, and decrypts the encrypted prices. Further, the transaction server 10 executes a transaction using the decrypted price by Zaraba scheme.

Figure 8:
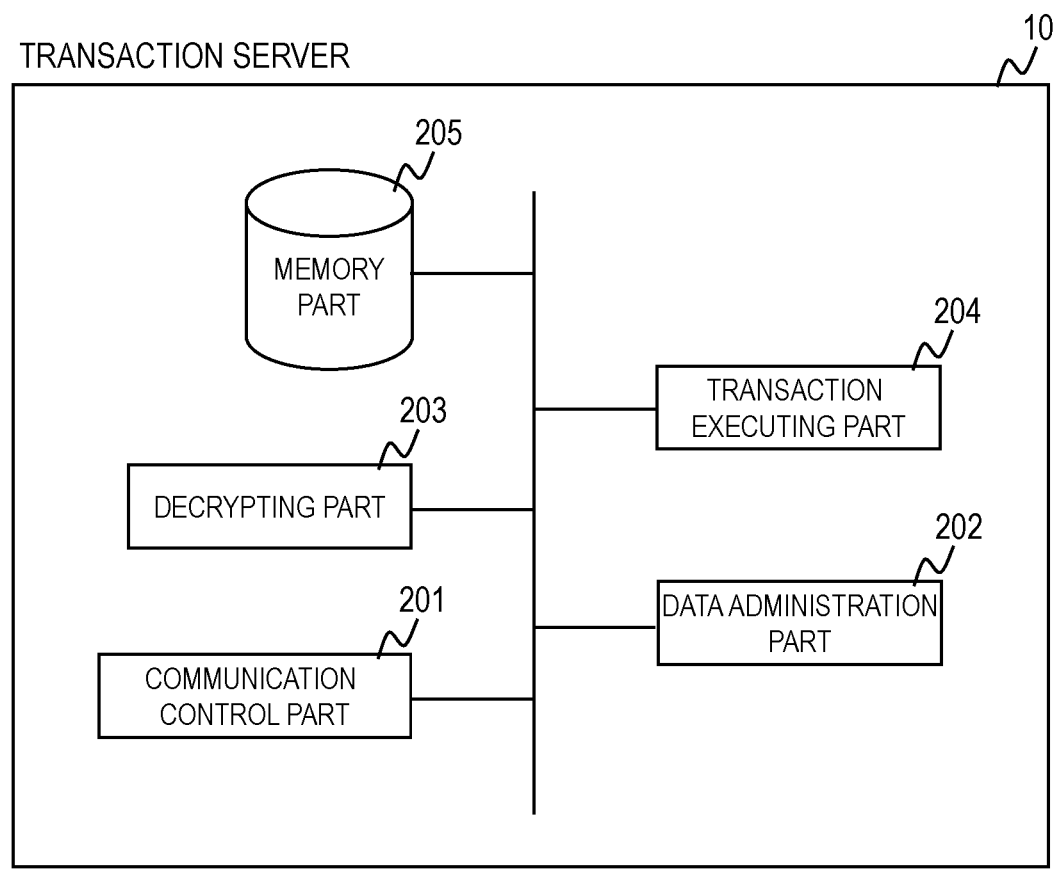
FIG. 8 is a block diagram illustrating an example of an operational configuration of the transaction server according to the first exemplary embodiment.

FIG. 8 is a block diagram illustrating an example of an operational configuration of the electronic transaction system according to the first exemplary embodiment. Referring to FIG. 8, the transaction server 10 is configured by including communication control part 201, data administration part 202, decrypting part 203, executing transaction part 204, memory part 205.

The communication control part 201 is a means configured to control NIC14, realizing communication with other apparatuses (mainly administration server 40). The communication control part 201 is also a means configured to distribute messages (packets) to each of the processing modules, or transfer messages received from each of the processing modules to other apparatuses.

The memory part 205, realized by the memory 12, is a means configured to store information necessary for processing each of the processing modules.

The data administration part 202 is a means configured to access the electronic bulletin board, and administrate data of electric power transaction (bid data, contracted data, erased data). The data administration part 202 accesses periodically the electronic bulletin board, gets newly written bid data (that the transaction server 10 has never got) to the electronic bulletin board. The data administration part 202 hands the got bid data over the decrypting part 203. Also, the data administration part 202 writes result of transaction by the transaction executing part (contracted data, erase data) via the communication control part 201.

The decrypting part 203 is a means configured to decrypt encrypted bid data using a private key of the transaction server 10. More concretely, the decrypting part 203 decrypts encrypted bid data using the private key. Result of decrypting (bid data of plain text) is stored into the memory part 205.

The transaction executing part 204 is a means configured to execute transaction (electric power transaction) using bid data. The transaction executing part 204 realizes an electric power transaction by so-called Zaraba scheme. More concretely, the transaction executing part 204 establishes a transaction in the order (first matching) of matching price and quantity among many of sell bids and buy bids.

More concretely, the transaction executing part 204 establishes the transaction according to 'principle of price priority' and 'principle of time priority'. For example, in case of buying order (buy bid), a transaction is established under a condition that a buy order of a higher price is prioritized over a buy order of a lower price. In case of selling order, a transaction is established under a condition that a sell order of a lower price is prioritized over a sell order of a higher price. In case of orders at a same price, a transaction is established under a condition that an order of first bid is prioritized over an order of later bid.

The transaction executing part 204 administrates status of bid (uncontracted bid data) using a 'bid administration table', and executes the transaction using the table. The bid administration table is a table information that sequentially lists uncontracted bid data with respect to sell order and buy order, respectively.

FIG. 9 is a diagram illustrating an example of bid administration table. As FIG. 9 illustrates, quantities of uncontracted bid data are sequentially listed by price, and administration is performed. Note that on diagrams including FIG. 9, however units of quantity (quantity of sell, quantity of buy) and of price are not described, and these units can be arbitrary. For example, it is possible to adopt 'kWh' as unit of quantity, 'yen' as unit of price.

The transaction executing part 204 or the data administration part 202 can create a bid administration table illustrated in FIG. 9 by tracing data of the electric power transactions that have been written to the electronic bulletin board.

Here, as described above, the electric power transaction is executed according to the 'principle of price priority' and the 'principle of time priority'. Therefore, the administration is carried out not only by simple combination of quantity and price as illustrated in FIG. 9, but in fact, details of bid data contained in each price (data) are administrated. For example, as described in a speech bubble in FIG. 9, details (participant's ID, quantity, bid time) of uncontracted bid data are administrated per each price (data).

Note that it is favorable to use information written to bid data as to participant's ID and quantity. Regarding the bid time, it is favorable to use date and time of generation (time stamp) of the bid data. Also, when the transaction executing part 204 contracts sell bid and buy bid, the results of the contracts are reflected (added) to the bid administration table.

Figure 10:
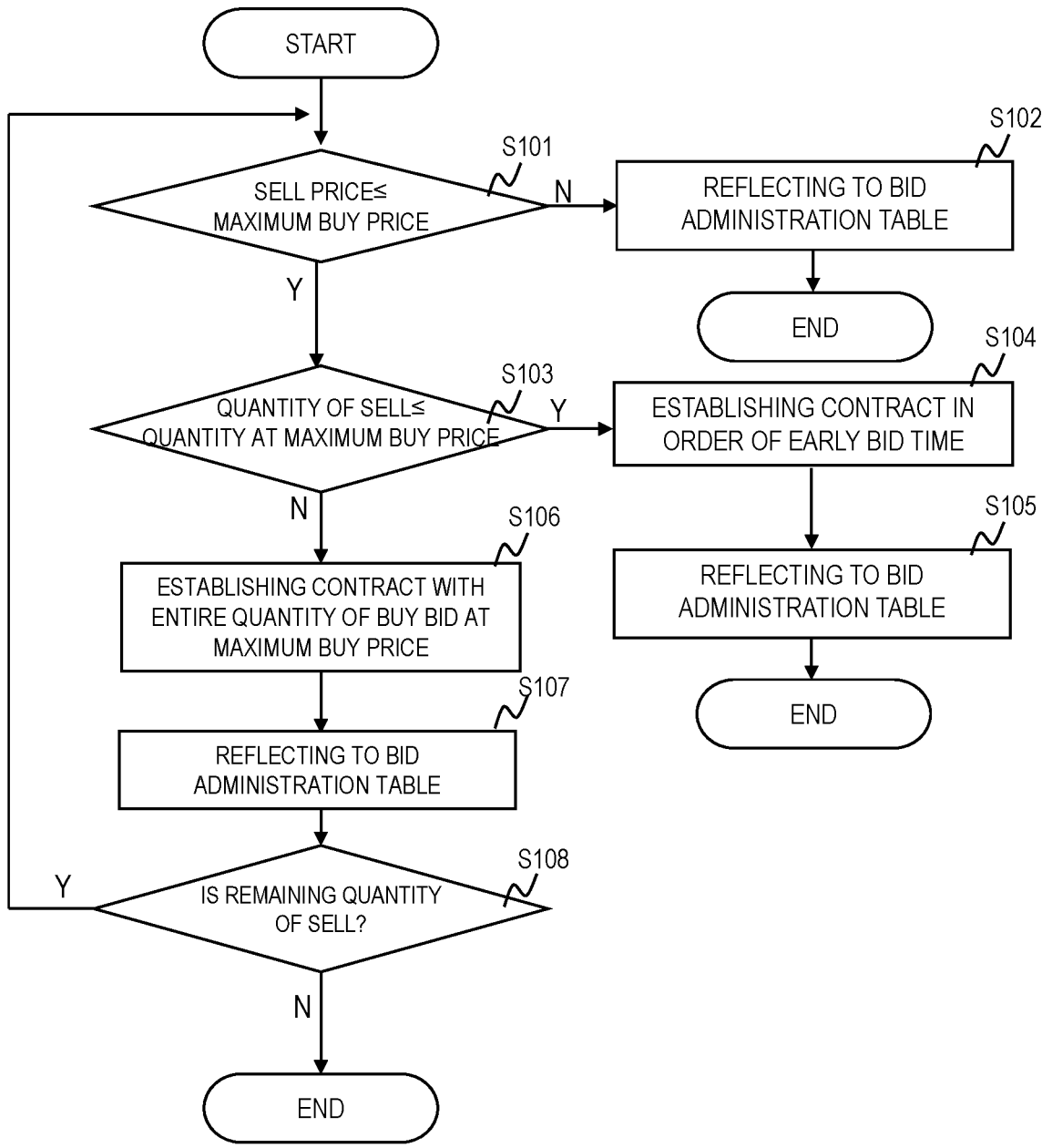
FIG. 10 is a flowchart diagram illustrating an example of an operation in an executing transaction part.
Figure 11:
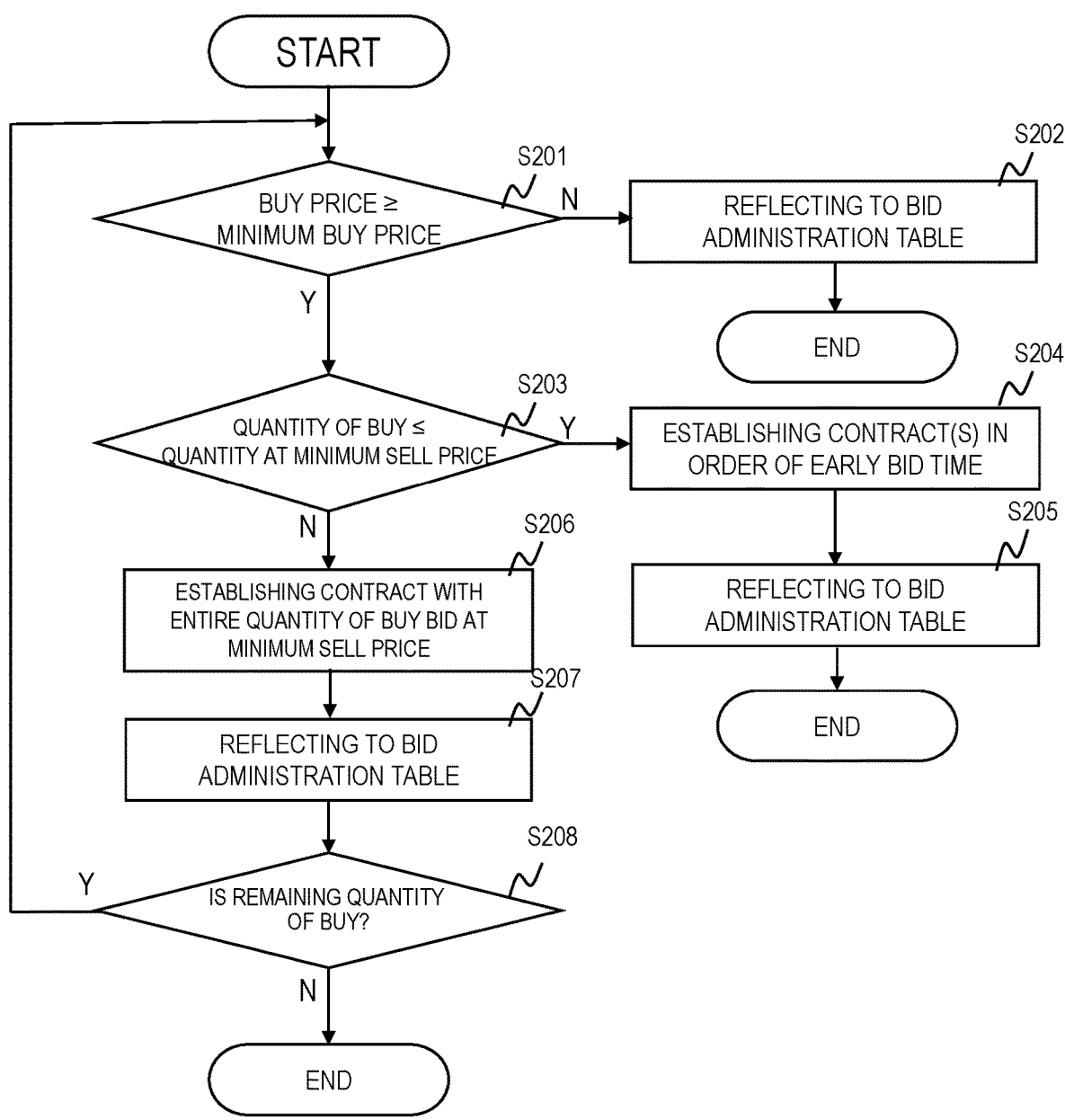
FIG. 11 is a flowchart diagram illustrating an example of an operation in an executing transaction part.

Next, operation of the transaction executing part 204 is described, by referring to FIG. 10 and FIG. 11.

The transaction executing part 204 gets bid data stored in the memory part 205 and processes bid data of older bid time (time stamp) in order.

At that time, the transaction executing part 204, when bid data is 'seller bid data', processes the bid data according to a flowchart diagram illustrated in FIG. 10. The transaction executing part 204, when bid data is 'buyer bid data', processes the bid data according to a flowchart diagram illustrated in FIG. 11.

First, operations in case where bid data is 'sell bid data' are described.

At step S101 illustrated in FIG. 10, the transaction executing part 204 judges whether or not sell price (desired price to sell) of sell bid data that is subject to process is equal to or less than a maximum buy price (desired price to buy) administrated based on the bit administration table. For example, in an example illustrated in FIG. 9, a sell price is compared with the maximum price '19' of the buy price.

If the sell price is higher than the maximum price of buy price (Step S101, No branch), the transaction executing part 204 reflects the sell bid data subject to process to the bid administration table, and then the above operation is ended (Step S102).

If the sell price is less than or equal to the maximum price of buy price (Step S101, Yes branch), the transaction executing part 204 judges whether or not quantity of sell (electric power quantity desired to sell) is less than, or equal to the quantity of buy at the maximum buy price. For example, in an example illustrated in FIG. 9, the quantity of the sell is compared with the quantity of buy '40' at the maximum buy price.

If the quantity of sell is less than or equal to the quantity of buy at the maximum buy price (Step S103, Yes branch), the transaction executing part 204 establishes contract(s) in order of early bid time (Step S104). For example, in an example illustrated in FIG. 9, if the number of sell is '30', the buy bid contracts with the earliest bid (bid time; 12:01) and the second earliest bid (bid time; 12:10).

The execution transaction part 204 reflects the results of the transaction (the results of the contracts) to the bid administration table, and then the operation is ended (Step S105).

If the quantity of sell is greater than the quantity of buy at the maximum buy price (Step S103 No branch), the transaction executing part 204 establishes contracts with entire quantity of sell bid which is a target of transaction at the maximum buy price (Step S106).

The transaction executing part 204 reflects the results of transactions (the results of contracts) to the vid administration table (Step S106).

In step S108, the transaction executing part 204 judges whether or not there remains quantity of uncontracted sell among quantity of sell bid data in the operation at step S106. For example, in an example illustrated in FIG. 9, if the quantity of sell be '50', the quantity of sell '40' is contracted at the maximum buy price '19' which results in a remaining quantity of sell being '10'.

If there is a remaining quantity of sell (Step S108, Yes branch), the transaction executing part 204 goes back to step S101, and the operation is continued. More concretely, the transaction executing part 204 processes the remaining sell using the bid administration table to which the result of partial contraction of the quantity of sell has been reflected. For example, in the above illustrated example, the remaining quantity of sell '10' comes to a contract with a buy bid of price '18'.

If there is no remaining quantity of sell (Step S108, No branch), the transaction executing part 204 ends the operation.

Next, operations of the transaction executing part 204 are described in case where bid data is 'buy bid data'.

In step S201 illustrated in FIG. 11, the transaction executing part 204 judges whether or not buy a price (price desired to buy) of buy bid data that is subject to operation is not less than a minimum price of the sell price (price desired to sell) administrated by the bid administration table.

If the buy price is less than the minimum sell price (Step S201, No branch), the transaction executing part 204 reflects the buy bid data subject to processing to the bid administration table, and then the process is ended (Step S02).

If the buy price is not less than the minimum sell price (Step S201, Yes branch), the transaction executing part 204 judges whether or not the quantity of buy (electric power quantity desired to buy) is less than or equal to the quantity of sell at the minimum sell price (Step S203).

If the quantity of buy is not more than the quantity of buy at the minimum sell price (Step S203, Yes branch), the transaction executing part 204 establishes contract(s) in order of early sell bid time (Step S204).

The execution transaction part 204 reflects the results of the transaction(s) (the result(s) of the contract(s)) to the bid administration table, and then the operation is ended (Step S205).

If the quantity of buy is not more than the quantity of sell at the minimum sell price (Step S203, No branch), the transaction executing part 204 establishes contract(s) with entire quantity of buy bid which is a target of transaction at a minimum sell price (Step S206).

The transaction executing part 204 reflects the result of transaction(s) (the result of the contract(s)) to the bid administration table (Step S207).

In step S208, the transaction executing part 204 judges whether or not there is remaining quantity of buy uncontracted in the operation of step S206 within the quantity of buy bid data.

If there is remaining quantity of buy (Step S208, Yes branch), the transaction executing part 204 goes back to step S201, and the operation is continued.

If there is no remaining quantity of buy (Step S208, No branch), the transaction executing part 204 ends the operation.

The transaction executing part 204, when the operation relating to newly got bid data by the data administration part 202 is ended, stores the result of transaction (contracted data, erase data) into the memory part 205, as necessary. The data administration part 202 writes the above result of transaction(s) by the transaction executing part 204 to the electronic bulletin board via the communication control part 201.

[Operational Configuration of Terminal]

Next, detail of the terminal 20 is described.

Figure 12:
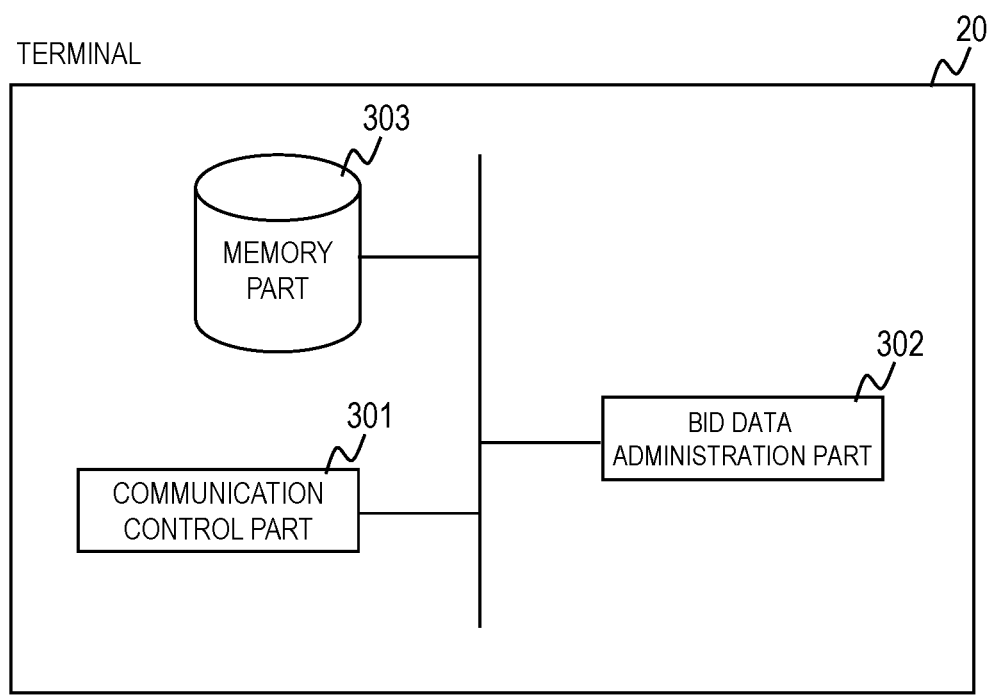
FIG. 12 is a block diagram illustrating an example of an operational configuration of the terminal according to the first exemplary embodiment.

FIG. 12 is a block diagram illustrating an example of operational configuration of the terminal 20 according to the first exemplary embodiment. Referring to FIG. 12, the terminal 20 is configured by including communication control part 301, bid data administration part 302, and memory part 303.

The communication control part 301 is a means configured to realize communication with other apparatus (mainly the administrating server 40). The communication control part 301 is a means configured to distribute messages (packets) received from other apparatus(es) or transmit messages to other apparatus(es).

The memory part 303 is a means configured to memorizing information, etc. that is necessary for operation of each of modules.

The bid data administration part 302 is a means configured to administrate bid data (sell bid data, buy bid data). More concretely, the bid data administration part 203 generates bid data illustrated in FIG. 4 according to the operation by a user (seller, buyer).

Further, the bid data administration part 302 encrypts the generated bid data using the public key of the transaction server 10. The bid data administration part 302 writes the encrypted bid data to the electronic bulletin board.

Also, the bid data administration part 302 gets contracted data written to the electronic bulletin board. If the got contracted data includes TXID that is assigned to bid data of its own, the bid data administration part 302 judges that the bid of its own has been contracted. At that time, the bid data administration part 302 may display the result of the contract on an LCD (liquid crystal display), etc.

[The Administration Server]

The administration server 40 making up the data administration system 30 is an apparatus that provides the electronic bulletin board using blockchain technology. Since the electronic bulletin board using blockchain is evident to those skilled in the art, the description is omitted.

As above described, in the electronic transaction system according to the first exemplary embodiment, participants encrypt bid data of their own with a public key of the transaction server 10, and register the data to the electric bulletin board. Only the transaction server 10 that has the private key can decrypt the encrypted bid data. The participant (the terminal 20) cannot know the contents. As a result, the secret of bid information is kept, the electronic transaction system according first exemplary embodiment can provide a fair transaction.

Also, in the electronic transaction system according to the first exemplary embodiment, the electric power transaction data (bid data, contracted data, erased data) is exchanged via the electronic bulletin board system realized by blockchain technology. As a result, the fraud, etc. (data tampering, etc.) against the contracted data by the transaction server 10 can be prevented.

Second Exemplary Embodiment

Next, a second exemplary embodiment will be described in detail with reference to the drawings.

In the first exemplary embodiment, the electronic transaction system secures its legitimacy by encrypting bid data. However, participants cannot confirm whether or not the transaction (contract of bid, uncontract of bid) of the transaction server 10 is legitimate. Since bid data is encrypted with the public key of the transaction server 10, the participants are limited to be able to get the encrypted bid data even if the participants access the electronic bulletin board.

In other words, there is room to make unfair transaction such that an exchange (administrator of the transaction server 10) does not carry out originally intended transaction (for example, principle of price priority, etc.). For example, although a buy price of participant A is higher than that of participant B, a transaction that prioritizes to contract bid of participant B may occur. In the second exemplary embodiment, an electronic transaction system that prevents such fraud by the exchange (administrator of the transaction server 10) is described.

Figure 13:
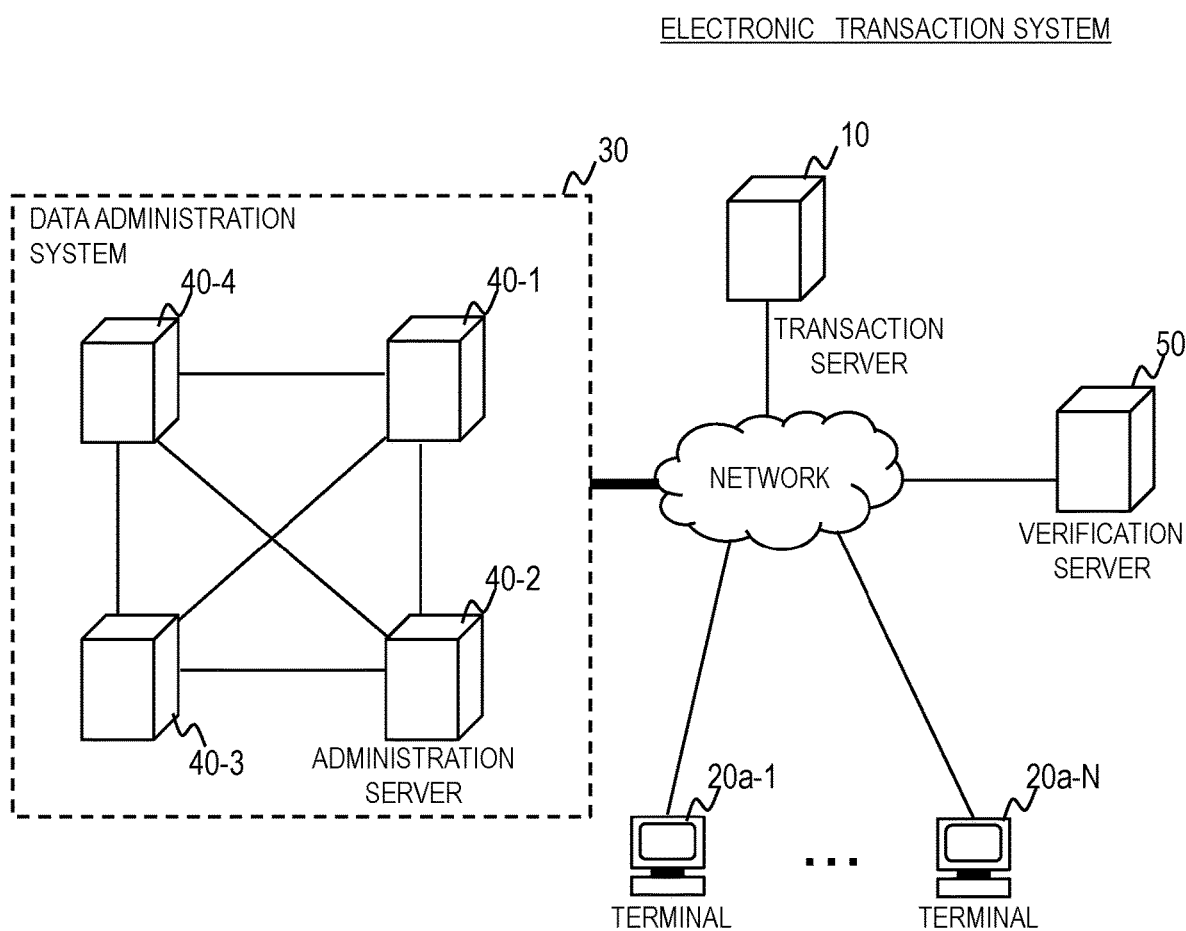
FIG. 13 illustrates an example of a schematic configuration of an electronic transaction system according to a second exemplary embodiment.

FIG. 13 illustrates an example of configuration of an electronic transaction system according to the second exemplary embodiment. Referring to FIG. 13, a verification server 50 is added to the electronic transaction system according to the first exemplary embodiment illustrated by FIG. 2.

The verification server 50 is an apparatus that provides information to verify the legitimacy (fairness) of the transaction made by the transaction server 10. More concretely, the verification server 50 generates verification data including verification character string to verify the legitimacy of the transaction made by the transaction server 10 using encrypted price of uncontracted bid data and encrypted price of bid data subject to verify the legitimacy of the transaction. The detail of the verification server 50 is described below.

Since there is no difference between the configuration, operation of the transaction server 10 according to the second exemplary embodiment and those of described in the first exemplary embodiment, the description of the transaction server 10 corresponding to FIG. 7, FIG. 8, etc. is omitted.

Figure 14:
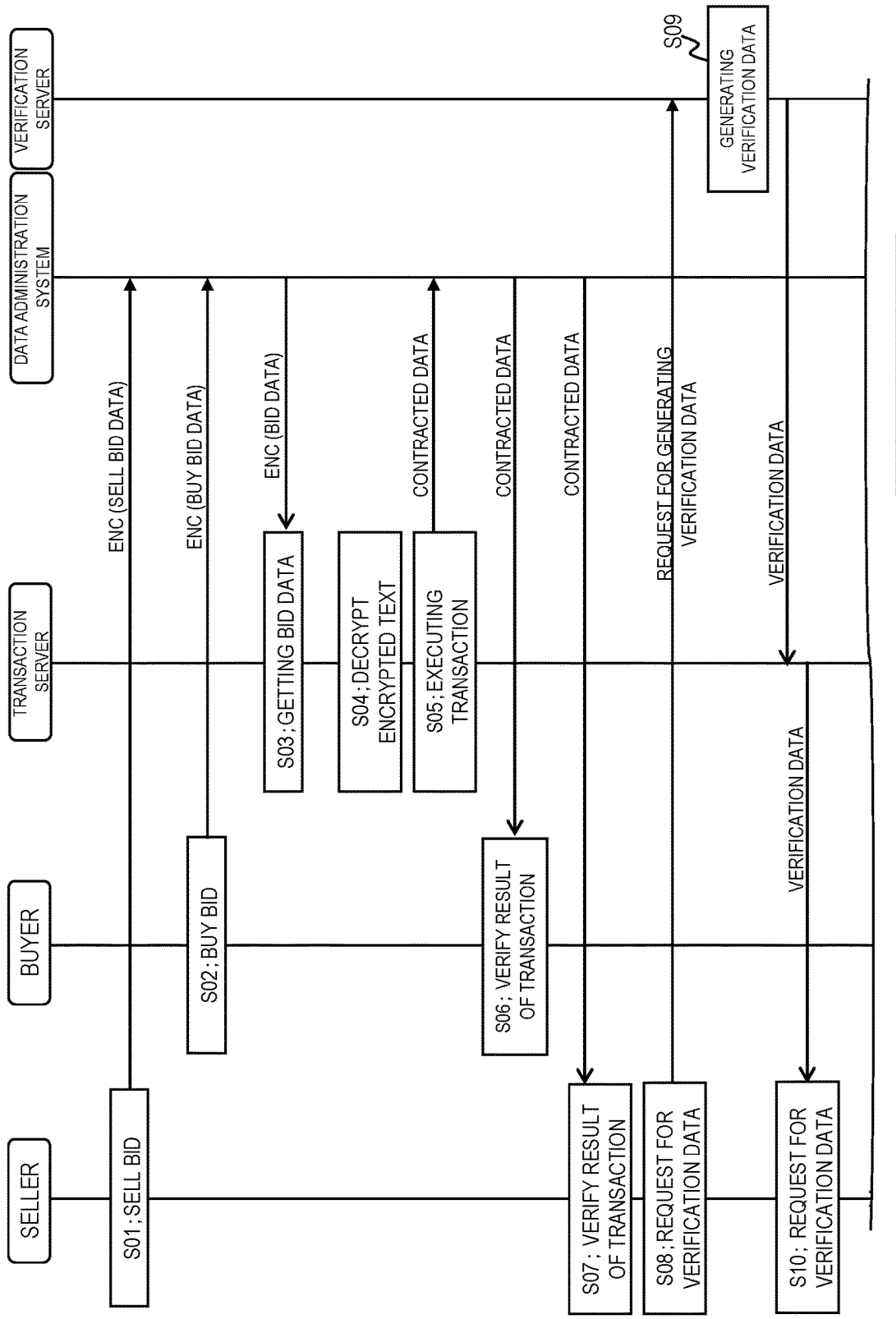
FIG. 14 is a sequence diagram illustrating an example of an operation in the electronic transaction system according to the second exemplary embodiment.

First, by referring to FIG. 14, the schematic operation of the electronic transaction system according to the second exemplary embodiment is described. In FIG. 14, the operation up to Step S07 can be the same as described with reference to FIG. 3, the description of the operation is omitted.

A terminal 20a (terminal of seller, terminal of buyer), when the result of the transaction (contracted data) made by the transaction server 10 is written to the electronic bulletin board, verification of the legitimacy of the transaction is needed, requests generating the above described verifying data to the verification server 50. Concretely, the terminal 20a specifies the kind of sell and buy to be requested for verification and TXID of bid data subject to verification, and transmits 'request for generating verification data' to the verification data (Step S08). Note that in FIG. 14, the case that the terminal of seller verifies the legitimacy regarding processing of sell bid data is illustrated.

The verification server 50, upon receiving a request for generating the above described verification data, without providing information of the price, etc. written to each of bid data, generates a verification character string that enables to verify the legitimacy of the transaction made by the transaction server 10. The verification server 50 writes information including the generated verification character string to the electronic bulletin board as 'verification data' (Step S09). In this way, the verification server 50 generates the verification data according to receiving the request for generating the verification data, and the generated verification data is written to the electronic bulletin board.

The terminal 20a (in FIG. 14, terminal of seller) gets the verification data written to the electronic bulletin board, verifies the legitimacy of the transaction using the verification character string included in the verification data. More concretely, the terminal 20a puts the verification character string included in the verification data in a verification function described below, based on the output result of the verification function, judges whether or not the operation of the bid data by the verification server 50 was legitimate.

Note that the terminal 20a can verify whether or not its own bid data is correctly processed, but cannot get information except for the above-mentioned result of the verification. Concretely, the terminal 20a cannot know bid price, etc. of others. Namely, the electronic transaction system according to second exemplary embodiment sets verification server 50 as prover, sets the terminal 20a as verifier, and realizes 'Zero-Knowledge Proof (System)' which enables to verify the legitimacy of the transaction by the transaction server 10 without giving any information to the terminal 20a. That is, the verification regarding the legitimacy of the transaction of the verification server 50 is 'Zero-Knowledge Proof (System)' in which it is impossible for the terminal 20a to know the price of the bid data and is possible for the terminal 20a to verify the legitimacy of the transaction by the verification sever 50.

Next, each apparatus of the terminal 20a and the verification server 50 is described below.

[Operational Configuration of the Terminal]

Figure 15:
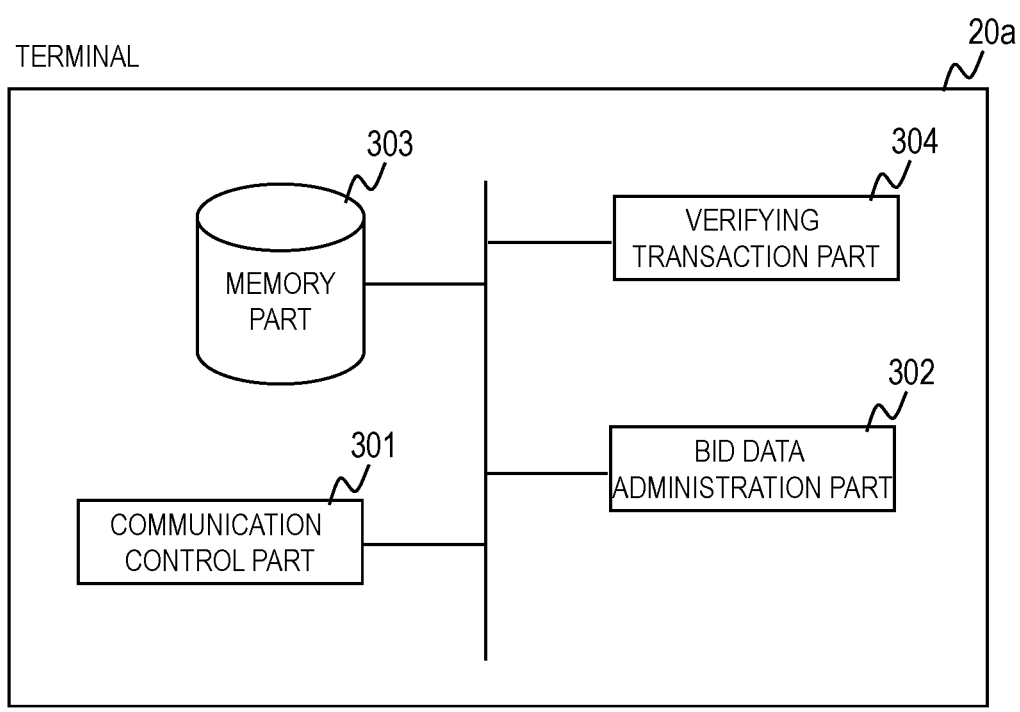
FIG. 15 illustrates an example of an operational configuration of a terminal according to the second exemplary embodiment.

FIG. 15 illustrates an example of operational configuration of the terminal 20a according to the second exemplary embodiment. Referring to FIG. 15, the terminal 20a according to the second exemplary embodiment further has a verifying transaction part 304.

The verifying transaction part 304 is a means configured to verify the legitimacy of the transaction made by the transaction server 10. The verifying transaction part 304 gets the verification data from the electronic bulletin board, verifies the legitimacy of the transaction made by the transaction server 10 using the verification character string(s) included in the verification data.

Note that the bid data administration part 302 in the terminal 20a according to the second exemplary embodiment encrypts at least the price out of four elements (type of sell or buy, participant ID, quantity, price) configuring bid data. At that time, the bid data administration part 302 generates an encrypt text having quasi-homomorphism from the price of the bid data, while using the public key of the transaction server 10. According to the second exemplary embodiment, it enables to operate (process) each of encrypted prices by encrypting the price(s) of the bid data with an encryption scheme having quasi-homomorphism.

When the terminal 20a encrypts other element (for example, quantity of electric power), the bid data administration part 302 may encrypt the other elements (individually) apart from the price.

[Operational Configuration of Verification Server]

Next, detail of the verification server 50 is described. Note that since the hardware configuration of the verification server may be identical with the transaction server, etc., description of the hardware configuration of the verification server is omitted.

The verification server 50 generates the verification character string that enables to verify the legitimacy of the transaction made by the transaction server 10 in response to the request for generating verification data from the terminal 20a, and writes the verification data including the verification character string(s) generated by itself to the electronic bulletin board.

Figure 16:
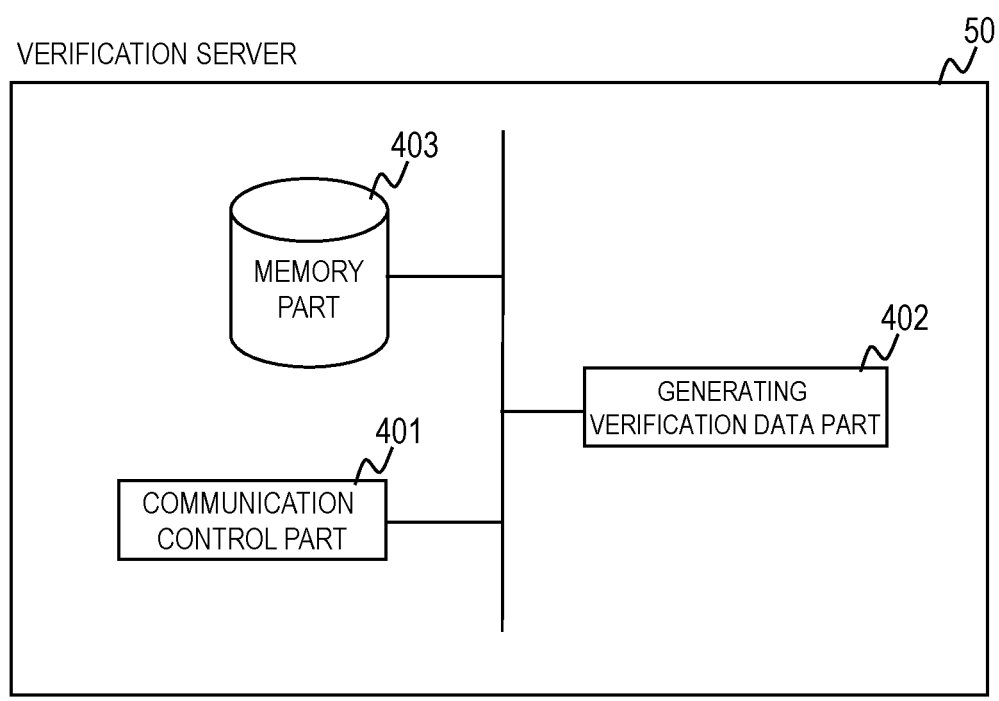
FIG. 16 illustrates an example of an operational configuration of a verification server according to the second exemplary configuration.

FIG. 16 illustrates an example of the operational configuration of the verification server 50 according to the second exemplary embodiment. Referring to FIG. 16, the verification server 50 is configured by including communication control part 401, generating verification data part 402, and memory part 403.

The communication control part 401 is a means configured to realize communication with other apparatus(es) (mainly, administration server 40). The communication control part 401 is also a means configured to distribute messages (packets) received from other apparatuses to each of operating modules (parts) or transmit messages received from each of operating modules to other apparatuses.

The memory part 403 is a means configured to memorize necessary information for each of operation modules to operate.

The generating verification data part 402 is a means configured to generate the verification data verifying the legitimacy of the transaction made by the transaction server 10 in response to the request from the terminal 20a. The generating verification data part 402, if the request for generating the verification data is received, generates the verification character string(s) proving the legitimacy of the transaction made by the transaction data 10 using the electric power exchange data (bid data, contracted data) registered in the electronic bulletin board.

The generating verification data part generates verification data regarding four transactions by the transaction sever 10 as below.

A first transaction is the case where a sell bid is not contracted, and remains in the electronic bulletin board as uncontracted bid data.

A second transaction is the case where a sell bid is contracted, and disappears from the electronic bulletin board.

A third transaction is the case where a buy bid is not contracted, and remains in the electronic bulletin board as uncontracted bid data.

A fourth transaction is the case where a buy bid is contracted, and disappears from the electronic bulletin board.

Note that the generating verification data part 402 can judge which of the four transactions is a target of verification from information that is obtained from the terminal 20a (sell or buy as the verification target, TXID) and from the electronic bulletin board (bid data, contract data). Concretely, if type of sell or buy obtained from the terminal 20a is 'sell' and obtained TXID is not included in the contract data, the generating verification data part 402 can grasp that above the first transaction is a target of verification. Similarly, if type of sell or buy obtained from the terminal 20a is 'sell' and obtained TXID is included in the contract data, the generating verification data part 402 can grasp that above the second transaction is a target of verification.

The generating verification data part 402 generates the verification character string(s) that enables to verify the legitimacy of the above-mentioned four types of transactions by the methods disclosed by NPL 2, 3. NPL 2, 3 disclose the method of proving that plain text of certain encrypted text falls within a predetermined range without revealing the plain text. A person skilled in the art, using the method, can easily generate the verification character string(s) proving that the result of summation (subtraction) of two encrypted texts falls within a predetermined range.

Concretely, above NPL 2, 3 disclose respectively a generating function F to generate above the verification character string(s), a verification character string S generated by the generating function F, a verification function G to realize the verification of the legitimacy by the verification character string(s) S. In the following, while the generating function F and the verification function G are described as a single function respectively, F,G may also be those processed interactively between an apparatus of generating the verification data and an apparatus of verification.

The generating function F has a first cipher, a second cipher, and random number as inputs. Each of the first cipher and the second cipher is a price encrypted with the scheme of pseudo-homomorphic encryption. In the description hereinafter, these two ciphers are expressed using TXID of each price corresponding to the first cipher or the second cipher. For example, when the price (encrypted price) identified with TXID '01' is termed as the first cipher, it is expressed as $E_1(01)$. Similarly, when the price of the above TXID is termed as the second cipher, it is expressed as $E_2(01)$. Also, the random number input to the generating function F is expressed as R1.

The generating function F, as described in formula (1) below, generates the verification character string S in response to input of the above three parameters.

$$F(\text{first cipher } E_1, \text{second cipher } E_2, \text{random number } R1) = S \quad (1)$$

Here, the above generating function F is configured such that the result of verification made by the verification function G to be 'true', if the result of subtraction (differential value) of the second cipher from the first cipher (encrypted price) is positive or zero.

The verification function G is configured such that the above verification character string S and the random number are input. The random number input to the verification function is expressed as R2. The verification function G, as described in the formula (2) below, outputs whether the result of verification using the verification character S is 'true' or 'false'.

$$G(S,R2) = \text{true/false} \quad (2)$$

The fact that the output of the verification function G is 'true' proves that the condition (differential value between the first cipher and the second cipher is positive or zero) of generating the verification character string S is established. The fact that the output of the verification function G is 'false' proves that the condition of generating the verification character string S is not established.

Hereinafter, regarding the above four types of transactions made by the transaction server 10, the verifying operation of the generating verification data part 402 generating the verification data and that of the verifying transaction part 304 are described together.

[The First Transaction; Sell Bid is Uncontracted]
[Operation of Generating Verification Data]

In order to be able to verify the legitimacy of the first transaction, the generating verification data part 402 generates the verification character string proving a proposition (hereinafter, termed as the first proposition) that 'the sell bid data subject to verify is higher than the price of the uncontracted buy bid data'.

The generating verification data part 402, treats the encrypted buy price of uncontracted buy bid data as the second cipher, the encrypted sell price of the sell bid data subject to verify as the first cipher respectively, and generates the verification string S proving the above first proposition. The generating verification data part 402 generates the verification character string S for each of the uncontracted buy bid data.

The generating verification data part 402 writes the verifying data including generated a plurality of verifying character strings S and TXID of sell bid data subject to verify to the electronic bulletin board. The verification enables to verify the legitimacy that the sell bid data subject to verify is uncontracted.

For example, the status of bid just before the sell bid data subject to verify is written to the electronic bulletin board is illustrated in FIG. 17A. Further, the sell bid data of the target of verification is shown in FIG. 17B. Note that in FIG. 17A, TXID corresponding to the uncontracted bid data is written together in parentheses in the fields of quantity.

When the status is as illustrated FIG. 17, the generating verification data part 402 sets the encrypted buy price of each of three uncontracted buy bid data as the second cipher, and the encrypted sell price of sell bid data subject to verify as the first cipher, respectively, and generates verification character strings S using the generating function F as below.

$$F(E_1(30), E_2(21), R1) = S_1(30,21) \quad (3)$$

$$F(E_1(30), E_2(22), R1') = S_1(30,22) \quad (4)$$

$$F(E_1(30), E_2(23), R1'') = S_1(30,23) \quad (5)$$

Each of $E_1$, $E_2$ described above in the formula (3) ... (5) shows the first cipher or the second cipher. The number in the parentheses shows TXID set at the first cipher and the second cipher. Also, the number next to the verification character string S is a suffix to distinguish the generated verification character strings S. The number in the parentheses shows TXID input to the generating function F. Note that TXID in the parentheses of the verification character strings S are administrated together at the timing of generating the verification character string S by the generating verification data part 402, and are associated with the generated verification character string S in advance.

The generating verification data part 402 writes three of the verification character strings S described as formula (3) ... (5) and TXID corresponding to each of the verification character strings S to the electronic bulletin board as 'verification data'. The generating verification data part 402 writes also TXID specifying the sell bid data which is a target of verification for the written verification data to the electronic bulletin board.

In the above example, since the sell bid data of TXID '30' is a target of verification, TXID=30, $S_1$ (30,21), $S_2$ (30,22), $S_3$ (30,23) are written to the electronic bulletin board as the verification data.

[First Transaction; Sell Bid is Uncontracted]
[Operation of Verification by Verification Data]

Figure 18:
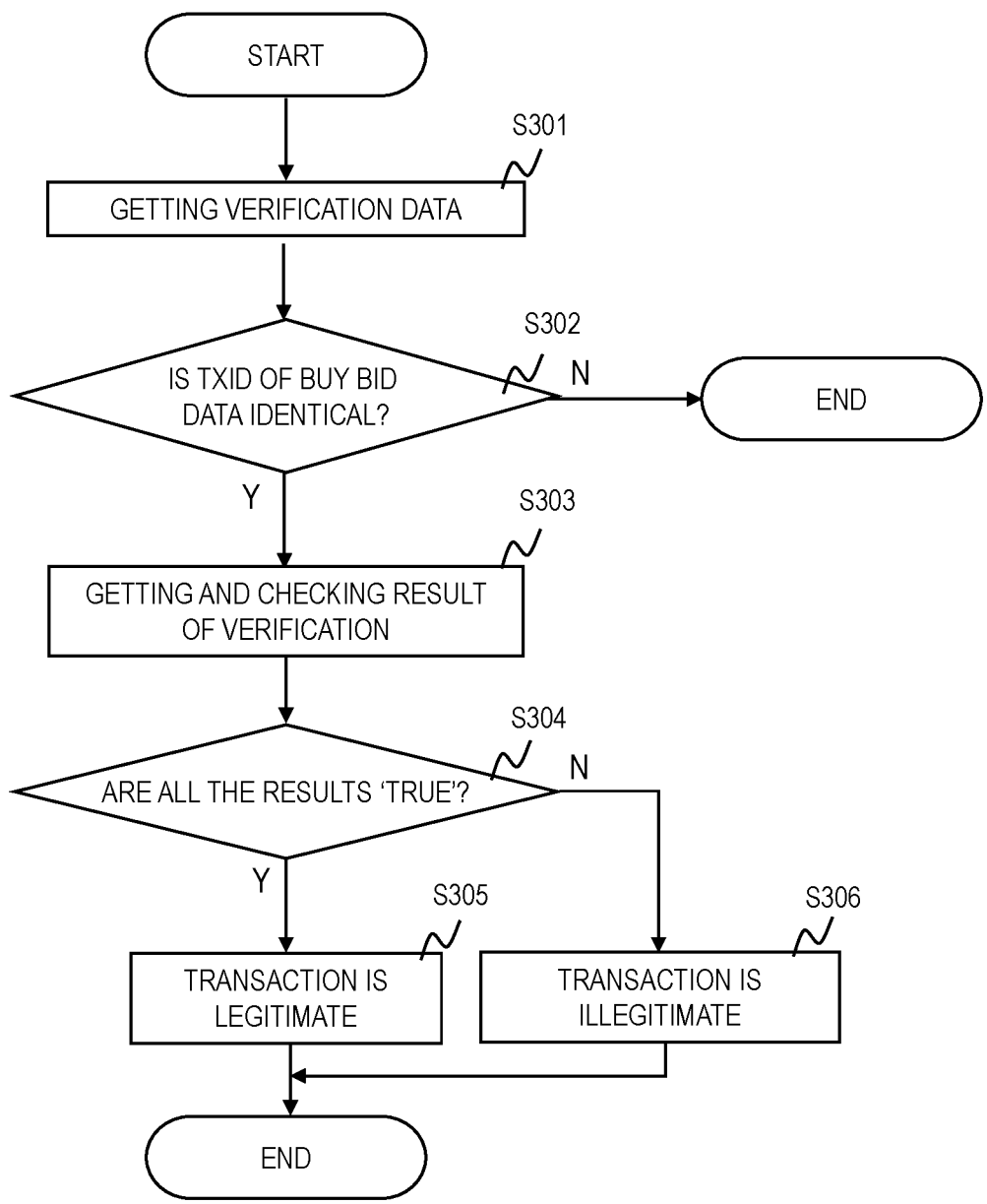
FIG. 18 is a flowchart diagram illustrating an example of an operation of verification in a terminal according to the second exemplary configuration.

Next, an operation to verify the legitimacy of transaction made by the transaction sever using the above verification data is described referring to FIG. 18.

The verifying transaction part 304 gets the verification data including the verification character strings S from the electronic bulletin board (Step S301).

Next, the verifying transaction part 304 checks TXID accompanied with each of the verification character strings S, judges whether or not the checked TXID is identical with TXID of uncontracted buy bid data at the timing of sell bid (Step S302).

If TXID is not identical (Step S302, No branch), the verifying transaction part 304 judges the verification data as insufficient, and ends the operation. For example, even though there are four uncontracted data in the electronic bulletin board, if there are three verification character strings S included in the verification data, the verification data is judged as insufficient. In this case, the terminal 20a makes a response such as a notification, etc. of that effect to the verification server 50.

If TXID is identical (Step S302, Yes branch), the verifying transaction part 304 inputs the verification strings S and the random number R2 to the verification function G, checks the truth of each of the verification character strings S (Step S303).

The verifying transaction part 304, if all the results of judgement by the verification function G are 'true' (Step S304, Yes branch), judges that it is legitimate for the sell bid data of its own to be uncontracted (Step S305). The fact that all of the results of judgement are 'true' means that the sell price in the sell bid data of its own is higher than the price that remains uncontracted in the buy bid data at the timing of sell bid. Thus, the verifying transaction part 304 can judge that the fact that sell bid data of its own remains uncontracted is legitimate.

In contrast, the verifying transaction part 304, if at least a part of the results of judgement by the verification function G is 'false' (Step S304, No branch), judges that the sell bid data of its own remains uncontracted as illegitimate (Step S306). The fact that at least a part of results of judgement is 'false' means that there is uncontracted buy bid data whose price is higher than the price of the sell bid data of its own. Thus, the verifying transaction part 304 can judge that the fact that sell bid data of its own remains uncontracted is illegitimate.

In the above example illustrated by FIG. 17, if the verification character string $S_1$ (30, 21) be 'true', it represents that the price of TXID '30' (sell price of sell bid) is higher than the price of TXID '21' (uncontracted buy price). Similarly, if the verification character string $S_2$ (30,22) be 'true', it represents that the sell price (TXID=30) subject to verify is higher than the uncontracted buy price (TXID=22). And thus, if all of the verification character strings S be 'true', it is proved that the sell price (encrypted sell price) subject to verify is higher than all of the uncontracted prices (encrypted buy prices).

[Second Transaction; Sell Bid is Contracted]
[Operation of Generating the Verification Data]

Next, the generation of the verification data regarding the second transaction is described. To prove the legitimacy of the second transaction, the generating verification data part 402 generates two verification character strings that enable to prove two propositions (the second proposition, the third proposition).

The second proposition is;
'The buy price of contracted buy bid data is the maximum buy price of uncontracted buy bid data'.

The third proposition is;
'The sell price of sell bid data subject to verify is less than or equal to the maximum buy price of uncontracted buy bid data'.

The second proposition proves that among the uncontracted buy bid data just before the sell bid data subject to verify is contracted, the price of the contracted buy bid data is the maximum buy price at the time of establishing the contract. This proves the legitimacy and legitimacy of the contracted price. Also, the third proposition proves the legitimacy of establishing contract of that sell bid data.

The generating verification data part 402, by calculating the possible combination of the uncontracted buy bid data, by setting each of the buy prices of buy bid data making up the combination as the first cipher and the second cipher, generates the verification character string S that proves the second proposition.

The generating verification data part 402 obtains the truth/false by applying generated a plurality of the verification character strings S to the verification function G (inputting the verification character strings S and the random number to the verification function G). If the result of the verification is 'true', the generating verification data part 402 can grasp that the price of the first cipher is higher than the price of the second cipher. Also, if the result of the verification is 'false', the generating verification data part 402 can grasp that the price of the first cipher is lower than the second cipher. The generating verification data part 402 specifies TXID of the highest buy price based on the result of verification.

For example, in an example illustrated by FIG. 17, the possible combination of TXID of the uncontracted buy bid data are (21, 22), (21, 23), (22, 23). Therefore, the generating verification data part 402 inputs the encrypted buy price for each of these combinations to the generating function F. Concretely, the generating verification data part 402 generates the below verification character strings S using the generating function F.

$$F(E_1(21),E_2(22),R1)=S_4(21,22) \qquad (6)$$

$$F(E_1(21),E_2(23),R1')=S_5(21,23) \qquad (7)$$

$$F(E_1(22),E_2(23),R1'')=S_6(22,23) \qquad (8)$$

Note that the numbers in the parentheses in the verification character string S, are TXID used when generating each of the verification character strings S, and are together administrated by the generating verification data part 402 at the timing of generating each of the verification character strings S, in association with the generated verification character strings S.

TXID of the maximum buy price is specified based on the results of the verification using the verification character strings $S_4$ to $S_6$ of formula (6) to (8). For example, if the result of the verification (true or false with the verification function G) of formula (6) is 'true', this means that the buy price of the buy bid data of that TXID '21' is higher than the buy price of the buy bid data of that TXID '22'. Judging the truth of formula (6) to (8), it can be specified that the buy price of the buy bid data of that TXID '21' is the maximum buy price.

The generating verification data part 402, treats the maximum buy price as the above first cipher, the sell price of sell bid data subject to verify as the above second cipher, respectively, and generates the verification character string S that proves the third proposition.

For example, in an example illustrated in FIG. 17, upon generation of the verification character string S of the second proposition, it has turned out that the buy price of the buy bid data of that TXID '21' is the maximum buy price. Therefore, the generating verification data part 402 generates the verification character string S described with formula (9) as below.

$$F(E_1(21), E_2(30), R1) = S_7(21, 30) \qquad (9)$$

The generating verification data part 402 writes the verification character strings S generated according to each of the second proposition and the third proposition and TXID corresponding to each of the generated verification character strings S to the electronic bulletin board. At that time, the generating verification data part 402 writes together with TXID that specifies the sell bid data, whose written verification data is subject to verify, to the electronic bulletin board together.

In the above described example, the sell bid data of TXID '30' is the bid data subject to verify. Therefore, TXID=30, $S_4$ (21, 22), $S_5$ (21, 23), $S_6$ (22, 23), $S_7$ (21, 30) are written to the electronic bulletin board as the verification data. The data including above verification characters S4 to S7 are written to the electronic bulletin board as the verification data that shows the legitimacy that the sell bid data is contracted.

[Second Transaction; Sell Bid is Contracted]
[Operation of Verification with the Verification Data]

Figure 19:
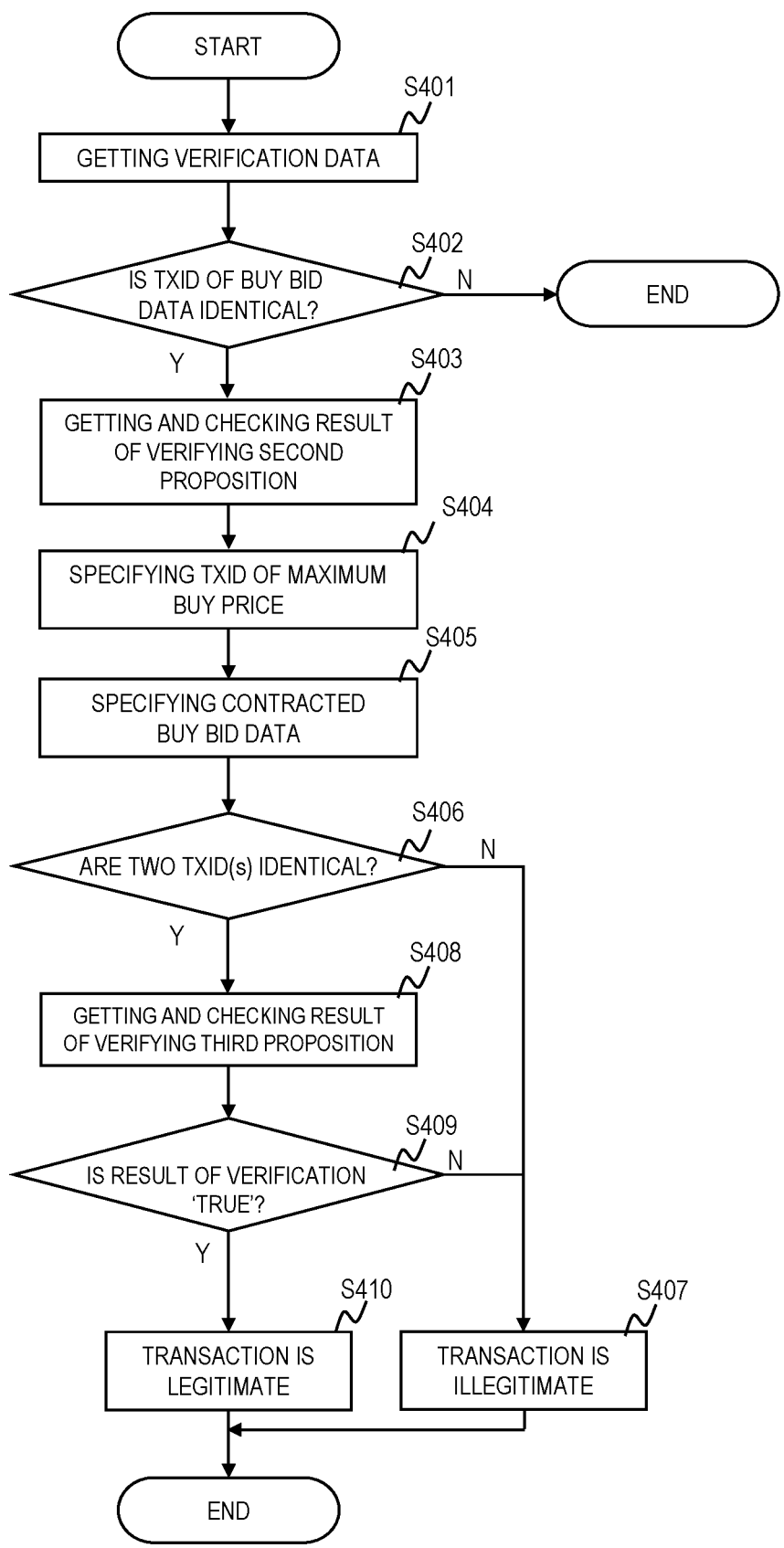
FIG. 19 is a flowchart diagram illustrating an example of an operation of verification in the terminal according to the second exemplary configuration.

Next, the operation of verifying the legitimacy of transaction with the transaction server 10 using the above verification data is described by referring to FIG. 19.

The verifying transaction part 304 gets the verification data including the verification character strings S for the second proposition and the verification character strings S for the third proposition from the electronic bulletin board (Step S401).

Next, the verifying transaction part 304 checks TXID accompanying the verification character strings S of the second proposition, judges whether or not checked TXID is identical with TXID of the buy bid data that was uncontracted at the timing of sell bid (Step S402).

If TXID is not identical (Step S402, No branch), the verifying transaction part 304 judges that the verification data is insufficient, and ends the operation. If TXID is identical (Step S402, Yes branch), the verifying transaction part 304 executes the operation from S403 et seq.

The verifying transaction part 304 inputs the verification character strings S for the second proposition and random number R2 to the verification function, and checks the truth (Step S403).

The verifying transaction part 304, according to the result of judgement (true or false) with the verification function G, specifies TXID of buy bid data for which the buy price is the maximum price (Step S404). Concretely, the verifying transaction part 304 specifies TXID for which the buy price is maximum price by similar operation to that of the generating verification data part 402 in the verification server 50.

In the above example, the verifying transaction part 304 specifies the buy price of the buy bid data for which TXID is '21' as the maximum buy price by the result of the judgement using the verification character strings S shown by formula (6) to (8).

Next, the verifying transaction part 304 specifies TXID of the buy bid data contracted with the sell bid data of its own by the contract data written in the electronic bulletin board (Step S405).

The verifying transaction part 304 judges whether or not the above two TXID are identical (Step S406).

The verifying transaction part 304, if TXID specified by the verification character strings S is not identical with TXID specified by the contracted data (Step S406, No branch), judges that the sell bid data of its own and the contracted buy bid data are illegitimate (Step S407). The fact that the two of TXIDs are not identical shows that the buy bid subject to verify contracts the buy bid other than the buy bid of the maximum price.

If TXID specified by the verification character strings S is identical with TXID specified by the contract data (Step S406, Yes branch), the verifying transaction part 304 executes operations from S408 et seq. The operations from S408 et seq. are the verifying operation according to the third proposition.

When legitimacy of the second proposition is confirmed, the verifying transaction part 304 inputs the verification character strings S for the third proposition and the random number R2 to the verification function G, and checks the truth (Step S408).

The verifying transaction part 304, if the result of judgement with the verification function G is 'true' (Step S409, Yes branch), judges that the sell bid data of its own is contracted as legitimate (Step S410). The fact that the result of judgement is 'true' means that the sell price of the sell bid data of its own is lower than the maximum buy price of the contracted buy bid data. Therefore, the verifying transaction part 304 can judge that the fact that the sell bid data of its own is contracted is legitimate.

In contrast, the verifying transaction part 304, if the result of judgement with the verification function G is 'false' (Step S409, No branch), judges that the sell bid data of its own is contracted as unfair (Step S407). The fact that the result of judgement is 'false' means that the sell price of the sell bid data of its own is higher than the maximum buy price of the contracted buy bid data. Therefore, the verifying transaction part 304 can judge that the fact that the sell bid data of its own is contracted is illegitimate.

The above described example illustrated in FIG. 17, '21' is specified as the maximum buy price of TXID by the verification character strings $S_4$ to $S_6$. After this, the relation (higher/lower) between the sell price of the sell bid (TXID=30) of its own and the maximum buy price (TXID=21) is verified. If the maximum buy price is higher than the sell price of its own, it can be judged as legitimate to contract the sell bid subject to verify.

Next, a case that the buy bid data is subject to verify is described. In the case that the buy price is subject to verify, it is possible to verify the legitimacy of transaction by the transaction server 10 in a similar way to the sell bid. For example, when generating the verification character strings regarding the buy bid, the verification character strings can be generated that enable to verify the legitimacy regarding the buy bid by replacing the first cipher with the second cipher input to the generating function F as appropriate.

[Third Transaction; Sell Bid is Uncontracted]
[Operation of Generating Verification Data]

To prove the legitimacy of the third transaction, the generating verification data part 402 generates the verification character strings that prove the proposition (hereinafter, noted as the fourth proposition) that 'the buy price of the buy bid data subject to verify is lower than the sell price of the uncontracted sell bid data'.

The generating verification data part 402 treats the encrypted buy price of the uncontracted sell bid data as the above first cipher, the encrypted sell price of the buy bid data subject to verify as the above second cipher, and generates the verification character strings S that prove the above the fourth proposition. The generating verification data part 402 generates the verification character strings S for each of the uncontracted sell bid data.

The generating verification data part 402 writes the verification data including generated a plurality of the verification character strings S and TXID of buy bid data subject to verify to the electronic bulletin board. The verification data enable to verify the legitimacy that the buy bid data subject to verify is uncontracted.

[Third Transaction; Sell Bid is Uncontracted]
[Operation of Verification by Verification Data]

Figure 20:
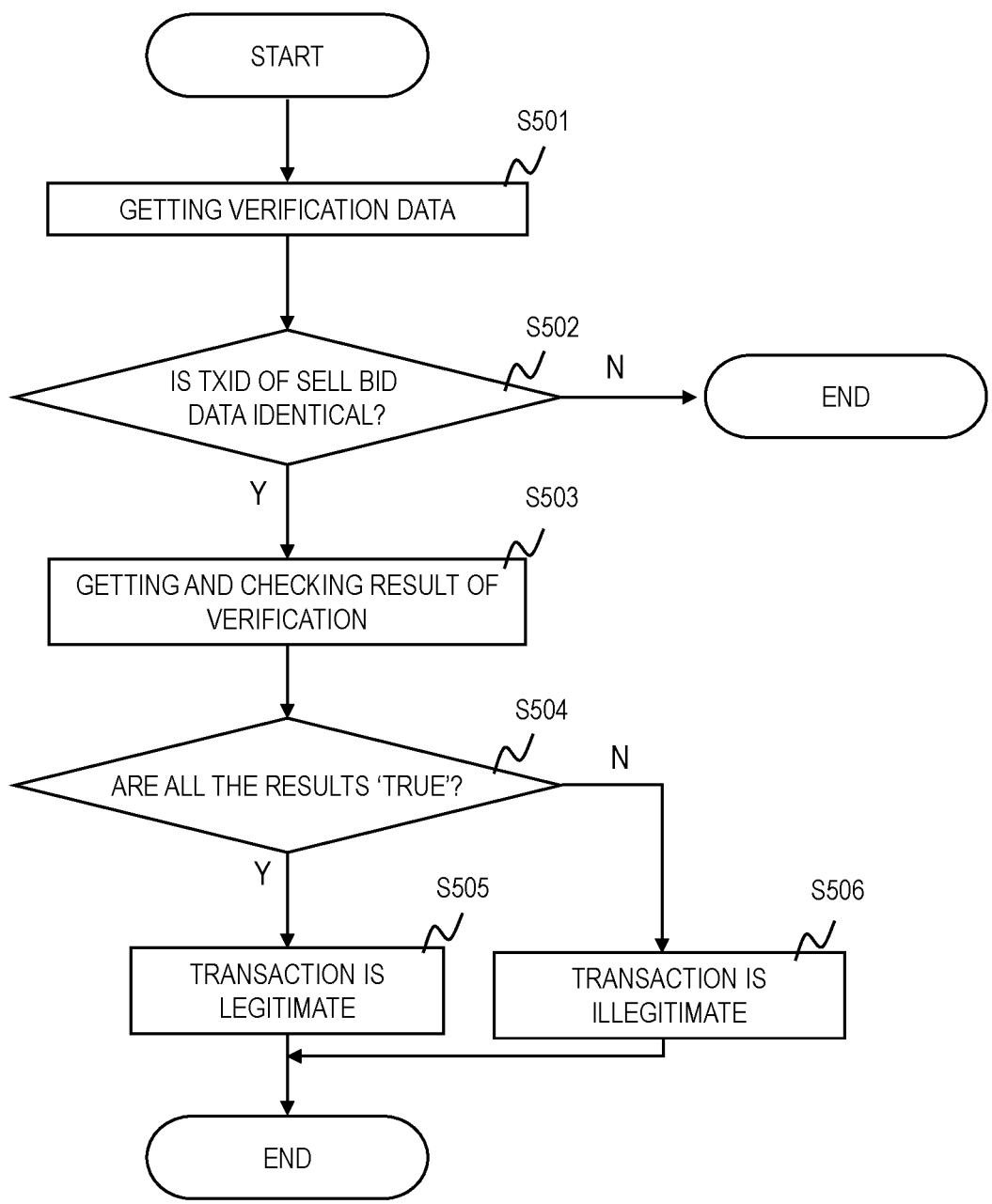
FIG. 20 is a flowchart diagram illustrating an example of an operation of verification in the terminal according to the second exemplary configuration.

Next, the operation of verifying the legitimacy by the transaction server using the above verification data is described by referring to FIG. 20.

The verifying transaction part 304 of the terminal 20a gets the verification data including the verification character string S from the electronic bulletin board (Step S501).

Next, the verifying transaction part 304 checks TXID accompanying each of the verification character strings S, and judges whether or not checked TXID is identical with TXID of the sell bid data uncontracted at the timing of buy bid (Step S502).

If TXID is not identical (Step S502, No branch), the verifying transaction part 304 judges the verification data as insufficient, and ends the operation.

If TXID is identical (Step S502, Yes branch), the verifying transaction part 304 inputs the verification character strings S and the random number R2 to the verification function G, and checks the truth/false on each of the verification character strings S (Step S503).

The verifying transaction part 304, if all of the results of judgement by the verification function G are 'true' (Step S504, Yes branch), judges that the fact that the buy bid data of its own is uncontracted is legitimate (Step S505).

The verifying transaction part 304, if at least one part of the results is 'false' (Step S504, No branch), judges that the fact that the buy bid data of its own is uncontracted is illegitimate (Step S506).

[Fourth Transaction; Buy Bid is Contracted]
[Operation of Generating Verification Data]

To prove the legitimacy of the fourth transaction, the generating verification data part 402 generates two verification character strings that prove two propositions (the fifth proposition, the sixth proposition).

The fifth proposition is the proposition;
'The sell price of the contracted sell bid data is equal to the minimum sell price of the uncontracted sell bid data'.

The sixth proposition is the proposition that;
'The buy price of the contracted buy bid data subject to verify is not less than (i.e., equal to or higher than) the minimum sell price of the uncontracted sell bid data'.

The fifth proposition proves that among the uncontracted sell bid data that are just before the buy bid data subject to verify is contracted, the sell price of the contracted sell bid data is the minimum sell price at the timing of establishing the contract, and proves the legitimacy of the contracted price. Also, the sixth proposition proves the legitimacy of contracting the buy bid data.

The generating verification data part 402, calculates possible combination(s) of the sell price of the uncontracted sell bid data, and generates the verification character strings S proving the fifth proposition, by setting the sell prices of each of the sell bid data making up the combination(s) as the first cipher and the second cipher, respectively.

After this, the generating verification data part 402 gets the truth/false by applying the generated plurality of the verification character strings S to the verification function G (inputs the verification character strings S and the random number to the verification function G). The generating verification data part 402, if the result of verification is 'true', can grasp that the price of the first cipher is higher than the price of the second cipher. Also, if the result of verification is 'false', the generating verification data part 402 can grasp that the price of the first cipher is lower than the price of the second cipher. The generating verification data part 402, based on the result of verification, specifies TXID for which the sell price is the minimum sell price.

The generating verification data part 402 treats the minimum sell price as the above second cipher, and the buy price of the buy bid data subject to verify as the above first cipher, respectively, and generates the verification character strings S that prove the sixth proposition.

The generating verification data part 402 writes the verification character strings S that are generated corresponding to each of the fifth proposition and the sixth proposition, and corresponding TXID to the electronic bulletin board. At that time, the generating verification data part 402 together writes TXID that specifies the buy bid data for which the written verification data has set as the target of verifying.

[Fourth Transaction; the Buy Bid is Contracted]
[Operation of Verification by Verification Data]

Figure 21:
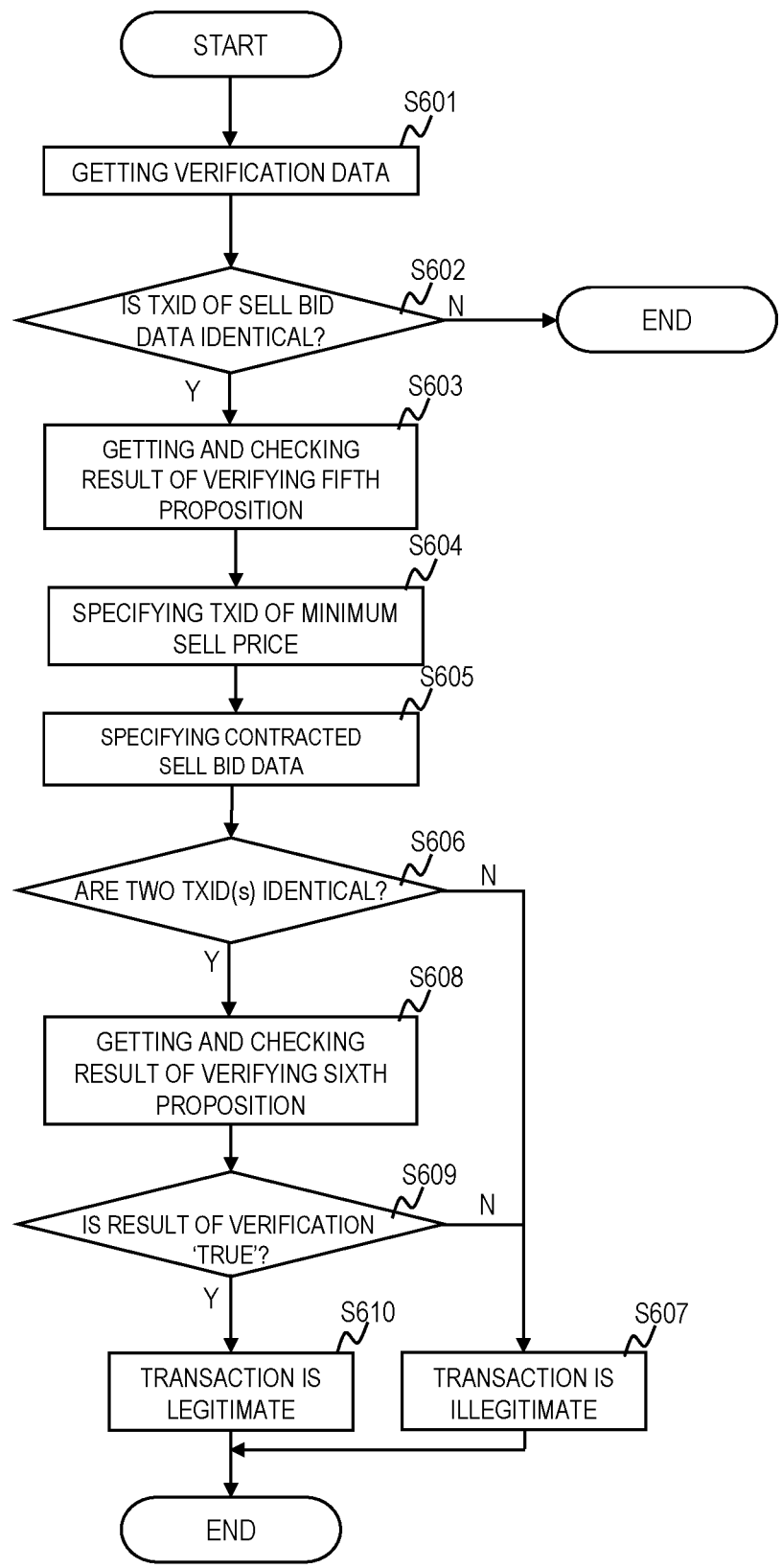
FIG. 21 is a flowchart diagram illustrating an example of an operation of verification in the terminal according to the second exemplary configuration.

Next, the operation of verifying the legitimacy of transaction by the transaction server 10 using the above verification data is described by referring to FIG. 21.

The verifying transaction part 304 gets the verification data including the verification character strings S for the fifth proposition and the verification character strings S for the sixth proposition from the electronic bulletin board (Step S601).

Next, the verifying transaction part 304 checks TXID accompanying the verification character strings S of the fifth proposition, judges whether or not the checked TXID is identical with TXID of the sell bid data uncontracted at the timing of the buy bid (Step S602).

If TXID is not identical (Step S602, No branch), the verifying transaction part 304 judges the verification data as insufficient, and ends the operation. If TXID is identical (Step S602, Yes branch), the verifying transaction part 304 executes the operation from Step S603 et seq.

The verifying transaction part 304 inputs the verification character strings S for the fifth proposition and the random number R2 to the verification function G, and checks the truth/false (Step S603).

The verifying transaction part 304 specifies TXID of the sell bid data for which the sell price was the minimum price according to the result of judgement (true or false) by the verification function G (Step S603).

Next, the verifying transaction part 304 specifies TXID of the sell bid data that contracted which the buy bit data of its own by the contracted data written to the electronic bulletin board (Step S605).

The verifying transaction part 304 judges whether or not the above two TXID are identical (Step S606).

The verifying transaction part 304, if TXID specified from the verification character strings S is not identical with TXID specified from the contracted data (Step S606, No branch), judges that the sell bid data contracted with the buy bid data of its own as illegitimate (step S607).

If TXID specified from the verification character strings S is identical with TXID specified from the contracted data (Step S606, Yes branch), the verifying transaction part 304 executes the operation from Step S608 et seq. The operations from step S608 et seq. are operations of verification by the sixth proposition.

When the legitimacy of the fifth proposition is confirmed, the verifying transaction part 304 inputs the verification character strings S and the random number R2 to verification function G, and checks the truth/false (Step S608).

The verifying transaction part 304, if the result of judgement by verification function G is 'true' (Step S609, Yes branch), judges that the fact that the buy bid data of its own has contracted is legitimate (Step S610).

The verifying transaction part 304, if the result of judgement by verification function G is 'false' (Step S609, No branch), judges that the fact that the buy bid data of its own has contracted is illegitimate (Step S607).

Note that the verification character strings of the above four transaction enable to verify whether the transaction server 10 executes the transaction according to 'the principle of price priority'. To verify whether the transaction server 10 executes the transaction according to 'the principle of price priority', the terminal 20a should check the timestamp of each of the bid data.

As above, in the second exemplary embodiment, the verification server 50 generates the verification character strings that enable to verify whether or not the transaction made by the transaction server 10 is legitimate. The terminal 20a that intends to verify the legitimacy of transaction verifies the legitimacy of the transaction using the verification character strings. At that time, the terminal 20a cannot know the price of the uncontracted bid data. Since information got from the verification character strings is limited to the large/small relation of the two of encrypted sentences. And thus, in the second exemplary embodiment, without giving any information provided for the terminal 20a regarding the price, the zero-knowledge proof verifying the legitimacy of the transaction made by transaction server 10 is realized. In other words, since the transaction server 10 comes to be observed by the terminal 20a by the above zero-knowledge proof, it is impossible to make a fraudulent action that is against the principle of Zaraba scheme. Also, while the encrypted bid price is shared with the transaction sever 10, the proofer (the verification server 50) and the verifier (the terminal 20), any illegitimate action that the transaction server 10 erases the bid itself is impossible.

The electronic bulletin board using blockchain technology guarantees that such fraudulent action cannot be done.

[Variations]

Note that since the configuration of the electronic transaction system described in the first and the second exemplary embodiments (FIG. 2, FIG. 13) are only examples, it is not intended to limit the configuration of the system. For example, the function of the verification server 50 may be included in the transaction server 10.

In the above exemplary embodiment, it is described that the terminal 20 encrypts the bid data using the public key of the transaction server 10. But the common key may be distributed to each of the terminals 20, and the terminals 20 may encrypt the bid data using the common key. In this case, the terminal 20, without encrypting the participant's ID, may be configured to enable to specify the common key used for decrypting in the transaction server 10. The encryption scheme disclosed in the present application is not limited to public key infrastructure (PKI) using the common key and private key.

In the above exemplary embodiments, it is described that latest bid status can be grasped for the transaction server 10 and the terminal 30 by tracing the electric power transaction as from the time the system starts the operation. However, long-term system operation will result in the need of much effort (cost) to grasp the bid status. Therefore, the transaction server, etc. may periodically write the data of latest bid status (list of uncontracted bid data) to the electronic bulletin board.

In the above second exemplary embodiments, the verification server 50 generates the verification data in response to receiving the request for generating the verification data from the terminal 20a. However, the verification server 50 may generate the verification data and write it to the electronic bulletin board without receiving the request for generating the verification data. For example, every time the bid is contracted, the verification server 50 may generate the verification data justifying each of the sell bid and the buy bid, and may register the verification data to the electronic bulletin board.

Also, in the flow chart diagrams used for above description, a plurality of processes (operations) is described in order, the process executed in each of the exemplary embodiment is not limited to the described order. In each of the exemplary embodiments, for example, executing each of processes in parallel, etc., the order of processes illustrated by the flow chart diagrams can be altered within a range of not offering trouble to the contents. Further, aforementioned exemplary embodiments may be combined unless any trouble will be brought about to the contents.

The above exemplary embodiments can partially or entirely be described, but not limited to, as follows.

[Mode 1]
See the electronic transaction system according to the above first aspect.

[Mode 2]
The electronic transaction system preferably according to mode 1, further comprising:
a verification server that generates verification data including a character string(s) for the transaction server to verify legitimacy of the transaction, using the encrypted bid price that remains uncontracted, and using the encrypted bid price that is a target of verification of the legitimacy of the transaction by the transaction server.

[Mode 3]
The electronic transaction system preferably according to mode 2, wherein the transaction server is configured to write contract data including an identifier (ID) of sell bid data and an identifier (ID) of buy bid data to the electronic bulletin board.

[Mode 4]
The electronic transaction system preferably according to mode 3, wherein the terminal is configured to get the written contract data and confirm whether or not its own bid has been contracted.

[Mode 5]
The electronic transaction system preferably according to mode 4, wherein the terminal is configured to transmit a request for generating verification data including the identifier (ID) of the bid data that is the target of verification; and
wherein the verification server is configured to generate the verification data in response to receiving the request for generating the verification data, and write the generated verification data to the electronic bulletin board.

[Mode 6]
The electronic transaction system preferably according to mode 5, wherein the terminal is configured to get the written verification data, input the verification character string(s) included in the verification data to a verification function, and based on an output of the verification function, judges whether or not the transaction of the bid data that is the target of verification executed by the transaction server was legitimate.

[Mode 7]
The electronic transaction system preferably according to mode 6, wherein the verification on the legitimacy of the transaction executed by the transaction server is zero-knowledge proof, that it is impossible for the terminal to know the price of the bid data, and that it is possible to verify legitimacy of the transaction by the transaction server.

[Mode 8]
The electronic transaction system preferably according to any one of modes 2 to 7, wherein the verification server is configured to generate a verification character string(s) that proves a first proposition that the selling price of the sell bid data that is the target of verification is higher than a buying price of a buy bid data that was not contracted, in a case where the verification server generates the verified data relating to the fact that the sell bid data is not contracted.

[Mode 9]
The electronic transaction system preferably according to any one of modes 2 to 8, wherein in a case where the verification server generates verification data relating to the fact that the sell bid data is contracted, the verification server is configured to generate a verification character string(s) that proves a second proposition that the buying price of the buy bid that was contracted is equal to the maximum buying price of the buy bid data that is not contracted, and a verification character string(s) that proves a third proposition that the selling price of the sell bid data that is a target of verification is not more than the maximum buying price of the buy bid data that is not contracted.

[Mode 10]
The electronic transaction system preferably according to any one of modes 2 to 9, wherein in a case where the verification server generates verification data relating to the fact that the buy bid data was not contracted, the verification server is configured to generate a verification character string(s) that proves a fourth proposition that the buying price of the buy bid data that is a target of verification is less than the selling price of the sell bid data that is not contracted.

[Mode 11]
The electronic transaction system preferably according to any one of modes 2 to 10, wherein in a case where the verification server generates verified data relating to the fact that the buy bid data was contracted, the verification server is configured to generate a verification character string(s) that proves a fifth proposition that a selling price of sell bid data that was contracted is equal to a minimum selling price of the sell bid data that is not contracted, and a verification character string(s) that proves a sixth proposition that the buying price of the buy bid data that is a target of verification is not less than a minimum selling price of the sell bid data that is not contracted.

[Mode 12]
The electronic transaction system preferably according to any one of modes 1 to 11, wherein the plurality of administration servers are configured to be directly interconnected, and each of the administration servers is configured to have a data management ledger to manage data received from the external, and every time it gets a request from an external apparatus to write data to the electronic bulletin board, it adds the data to the ledger.

[Mode 13]
See the transaction server according to the above second aspect.

[Mode 14]
See the verification server according to the above third aspect.

[Mode 15]
See the electronic transaction method according to the above fourth aspect.

[Mode 16]
See the program according to the above fifth aspect.

Note that modes 13 to 16 can be expanded in the same way as mode 1 is expanded to modes 2 to 12.

Note that the disclosure of the above PTL is incorporated herein by reference thereto. Variations and adjustments of the exemplary embodiment and examples are possible within the scope of the disclosure (including the claims) of the present invention and based on the basic technical concept of the present invention. Also, various combinations and selections of various disclosed elements (including the elements in the claims, exemplary embodiment, examples, drawings, etc.) are possible within the scope of the disclosure of the present invention. Namely, the present invention of course includes various variations and modifications that could be made by those skilled in the art according to the overall disclosure including the claims and the technical concept. Especially, about numerical value ranges disclosed by the description, even if the description does not particularly disclose arbitrary numerical values or small ranges included in the ranges, these values and ranges should be deemed to have been concretely disclosed.

REFERENCE SIGNS LIST 10, 103 transaction server
11 CPU (Central Processing Unit)
12 Memory
13 input-output interface
14 NIC (Network Interface Card)
20, 20a, 20-1 to 20-N, 20a-1 to 20a-N, 102 terminal
16, 24, 34, 46, 56 communication control part
20, 102 data storage apparatus
30 data administration system
40, 40-1 to 41-4, 101 administration server
50 verification server
201, 301, 401 communication control part
202 data administration part
203 decrypting part
204 transaction executing part
205, 303, 403 memory part
302 bid data administration part
304 verification transaction part
402 generating verification data part

What is claimed is:
1. An electronic transaction system comprising:
a plurality of administration servers configured to provide an electronic bulletin board;
a terminal configured to encrypt bid prices with an encryption scheme having homomorphism using a public key, and write bid data including the encrypted bid prices to the electronic bulletin board;
an independent transaction server configured to receive the bid data written to the electronic bulletin board, decrypts the encrypted bid prices using a private key corresponding to the public key, and execute a transaction using the decrypted bid prices by Zaraba scheme; and a verification server configured to:
  generate verification data including one or more character strings proving that a result of subtraction of first and second encrypted bid prices falls within a predetermined range to verify legitimacy of the transaction executed by the transaction server using the first and second encrypted bid prices, wherein:
    the first encrypted bid price remains uncontracted, and
    the second encrypted bid price is a target of verification of the legitimacy of the transaction executed by the transaction server; and
  write the verification data on the electronic bulletin board provided by the plurality of administration servers.

2. The electronic transaction system according to claim 1, wherein the independent transaction server is configured to write contract data including an identifier (ID) of sell bid data and an identifier (ID) of buy bid data to the electronic bulletin board.

3. The electronic transaction system according to claim 2, wherein the terminal is configured to receive written contract data and confirm whether or not a bid made by the terminal has been contracted.

4. The electronic transaction system according to claim 3, wherein the terminal is configured to transmit a request for generating the verification data including the identifier (ID) of the bid data that is the target of verification; and
  wherein the verification server is configured to generate the verification data in response to receiving the request for generating the verification data.

5. The electronic transaction system according to claim 4, wherein the terminal is configured to receive the written verification data, input the character strings included in the verification data to a verification function, and based on an output of the verification function, judge whether or not the transaction of the bid data that is the target of verification executed by the transaction server was legitimate.

6. The electronic transaction system according to claim 5, wherein the verification on the legitimacy of the transaction executed by the transaction server is zero-knowledge proof, that the bid prices of the bid data are impossible for the terminal to know, and the legitimacy of the transaction by the transaction server is possible to verify.

7. The electronic transaction system according to claim 1, wherein in a case where the verification server generates the verification data when sell bid data is not contracted, the verification server is configured to generate the one or more character strings that prove a first proposition that a selling price of the sell bid data that is the target of verification is higher than a buying price of buy bid data that was not contracted.

8. The electronic transaction system according claim 1, wherein in a case where the verification server generates the verification data when sell bid data is contracted, the verification server is configured to generate first character strings that prove a second proposition that a buying price of buy bid data that was contracted is equal to a maximum buying price of buy bid data that is not contracted and second character strings that prove a third proposition that a selling price of sell bid data that is the target of verification is not higher than a buying price of the buy bid data that is not contracted.

9. The electronic transaction system according to claim 1, wherein in a case where the verification server generates the verification data when buy bid data was not contracted, the verification server is configured to generate one or more character strings that prove a fourth proposition that a buying price of the buy bid data that is the target of verification is less than a selling price of sell bid data that is not contracted.

10. The electronic transaction system according to claim 1, wherein in a case where the verification server generates the verification data when buy bid data was contracted, the verification server is configured to generate first character strings that prove a fifth proposition that a selling price of sell bid data that was contracted is equal to a minimum selling price of sell bid data that is not contracted, and second character strings that prove a sixth proposition that a buying price of buy bid data that is the target of verification is not less than a minimum selling price of sell bid data that is not contracted.

11. The electronic transaction system according to claim 1, wherein the plurality of administration servers are configured to be directly interconnected, and each of the administration servers is configured to have a data management ledger to manage externally received data, and every time a request from an external apparatus to write data to the electronic bulletin board is received, the data is added to the ledger.

12. A server comprising:
  one or more processors; and
  one or more memories storing instructions executable by the one or more processors to:
  receive bid data, including prices encrypted by a terminal with an encryption scheme having homomorphism using a public key, the bid data written by the terminal to an electronic bulletin board provided by a plurality of administration servers;
  decrypt the encrypted prices using a private key corresponding to the public key;
  execute a transaction using the decrypted prices by Zaraba scheme;
  generate verification data including one or more character strings proving that a result of subtraction of first and second encrypted bid prices falls within a predetermined range to verify legitimacy of the transaction executed by the transaction server using the first and second encrypted bid prices, wherein:
    the first encrypted bid price remains uncontracted, and
    the second encrypted bid price is a target of verification of the legitimacy of the transaction executed by the transaction server; and
  write the verification data on the electronic bulletin board provided by the plurality of administration servers.

13. An electronic transaction method comprising:
  receiving, by an independent transaction server, bid data, including prices encrypted by a terminal with an encryption scheme having homomorphism using public key, the bid data written by the terminal to an electronic bulletin board provided by a plurality of administration servers;
  decrypting, by the independent transaction server, the encrypted prices using a private key corresponding to the public key;
  executing, by the independent transaction server, a transaction using the decrypted price by Zaraba scheme;
  generating, by a verification server, verification data including one or more character strings proving that a result of subtraction of first and second encrypted bid prices falls within a predetermined range to verify legitimacy of the transaction executed by the transaction server using the first and second encrypted bid prices, wherein:
the first encrypted bid price remains uncontracted, and the second encrypted bid price is a target of verification of the legitimacy of the transaction executed by the transaction server; and
writing, by the verification server, the verification data on the electronic bulletin board provided by the plurality of administration servers.

14. The method according to claim 13, wherein the independent transaction server is configured to write contract data including an identifier (ID) of sell bid data and an identifier (ID) of buy bid data to the electronic bulletin board.

15. The method according to claim 14, wherein a terminal is configured to receive written contract data and confirm whether or not a bid made by the terminal has been contracted.

16. The method according to claim 15, wherein the terminal is configured to transmit a request for generating the verification data including the identifier (ID) of the bid data that is the target of verification; and
wherein the verification server is configured to generate the verification data in response to receiving the request for generating the verification data.

17. The method according to claim 16, wherein the terminal is configured to receive the written verification data, input the character strings included in the verification data to a verification function, and based on an output of the verification function, judge whether or not the transaction of the bid data that is the target of verification executed by the transaction server was legitimate.

18. The method according to claim 17, wherein the verification on the legitimacy of the transaction executed by the transaction server is zero-knowledge proof, that the bid prices of the bid data are impossible for the terminal to know, and the legitimacy of the transaction by the transaction server is possible to verify.

19. A computer-readable, non-transitory recording medium storing programs executable by an independent transaction server and a verification server to perform processing comprising:
receiving, by the independent transaction server, bid data, including prices encrypted by an electronic with an encryption scheme having homomorphism using a public key, the bid data written by the terminal to an electronic bulletin board provided by a plurality of administration servers;
decrypting, by the independent transaction server, the encrypted prices using a private key corresponding to the public key;
executing, by the independent transaction server, a transaction using the decrypted price by Zaraba scheme;
generating, by the verification server, verification data including one or more character strings proving that a result of subtraction of first and second encrypted bid prices falls within a predetermined range to verify legitimacy of the transaction executed by the transaction server using the first and second encrypted bid prices, wherein:
the first encrypted bid price that remains uncontracted, and
the second encrypted bid price that is a target of verification of the legitimacy of the transaction executed by the transaction server; and
writing, by the verification server, the verification data on the electronic bulletin board provided by the plurality of administration servers.

\* \* \* \* \*